US012322561B2

(12) United States Patent
Rhein et al.

(10) Patent No.: US 12,322,561 B2
(45) Date of Patent: Jun. 3, 2025

(54) SIDE BREAK AIR SWITCH WITH ANTI-ROLLING BLADE LOCK

(71) Applicant: Hubbell Incorporated, Shelton, CT (US)

(72) Inventors: David Adelbert Rhein, Saint Jacob, IL (US); Nathan Scot Loucks, Highland, IL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/872,842

(22) Filed: Jul. 25, 2022

(65) Prior Publication Data

US 2022/0359137 A1 Nov. 10, 2022

Related U.S. Application Data

(63) Continuation of application No. 17/036,044, filed on Sep. 29, 2020, now Pat. No. 11,398,360, which is a continuation of application No. 16/010,837, filed on Jun. 18, 2018, now Pat. No. 10,804,055, which is a continuation of application No. 15/293,552, filed on Oct. 14, 2016, now Pat. No. 10,002,732.

(60) Provisional application No. 62/320,964, filed on Apr. 11, 2016, provisional application No. 62/241,183, filed on Oct. 14, 2015.

(51) Int. Cl.
*H01H 31/26* (2006.01)
*H01H 31/28* (2006.01)
*H01H 31/30* (2006.01)
*H01H 1/52* (2006.01)

(52) U.S. Cl.
CPC ............ *H01H 31/26* (2013.01); *H01H 31/28* (2013.01); *H01H 31/30* (2013.01); *H01H 1/52* (2013.01); *H01H 2031/286* (2013.01)

(58) Field of Classification Search
CPC ........ H01H 31/26; H01H 31/28; H01H 31/30; H01H 1/52; H01H 2031/286
USPC ................................ 200/48 SA, 48 R, 48 A
See application file for complete search history.

(56) References Cited

U.S. PATENT DOCUMENTS 3,174,004 A 3/1965 Stene et al.
3,627,939 A 12/1971 Myers
4,078,162 A 3/1978 Turner
8,829,372 B1 9/2014 Rhein
10,002,732 B2 6/2018 Rhein
10,804,055 B2 10/2020 Rhein et al.
(Continued)

FOREIGN PATENT DOCUMENTS

WO 2017066519 A1 4/2017

OTHER PUBLICATIONS

PCT/US2016/056971 International Search Report and Written Opinion dated Jan. 12, 2017.
(Continued)

*Primary Examiner* — Lheiren Mae A Caroc
(74) *Attorney, Agent, or Firm* — Michael Best & Friedrich LLP

(57) ABSTRACT

A blade assembly for an electrical switch. The blade assembly including a rocker assembly configured to enable rotation of said blade assembly. The rocker assembly including: a first rocker component, said first rocker component having a first rocker pin, and a second rocker component, said second rocker component having a second rocker pin that depresses when said first rocker pin is depressed.

12 Claims, 27 Drawing Sheets

(56) References Cited

U.S. PATENT DOCUMENTS

| | | | | |
|---|---|---|---|---|
| 11,398,360 | B2 * | 7/2022 | Rhein .................... | H01H 31/26 |
| 2013/0284575 | A1 | 10/2013 | Rhein et al. | |
| 2015/0243459 | A1 | 8/2015 | Rhein et al. | |

OTHER PUBLICATIONS

Australian Patent Application No. 2016338437 filed Apr. 16, 2018, Examination Report No. 1 dated Aug. 23, 2018.
U.S. Appl. No. 16/010,837, filed Jun. 18, 2018 now U.S. Pat. No. 10,804,055.
U.S. Appl. No. 15/293,552, filed Oct. 14, 2016 now U.S. Pat. No. 10,002,732.
U.S. Appl. No. 17/036,044, filed Sep. 29, 2020 now U.S. Pat. No. 11,398,360.
Canadian Patent Application No. 3,002,166 filed Oct. 14, 2016, Office Action dated Oct. 24, 2023 (4 pages).
Australian Patent Application No. 2023201252 Examination Report No. 2 dated May 23, 2024 (3 pages).

* cited by examiner

SIDE BREAK AIR SWITCH WITH ANTI-ROLLING BLADE LOCK

RELATED APPLICATION

This application claims priority to U.S. patent application Ser. No. 17/036,044, filed Sep. 29, 2020, which claims priority to U.S. patent application Ser. No. 16/010,837, filed Jun. 18, 2018, which claims priority to U.S. patent application Ser. No. 15/293,552, filed Oct. 14, 2016, which claims priority to U.S. Provisional Application Ser. No. 62/241,183, filed Oct. 14, 2015 and U.S. Provisional Application Ser. No. 62/320,964, filed Apr. 11, 2016, the disclosures of which are incorporated herein by reference in their entirety and to which priority is claimed.

FIELD

Various exemplary embodiments relate to a high voltage/high current air break switch that rotates about multiple axes to engage a distal electrical terminal.

BACKGROUND

High voltage/high current air break switches typically include an elongated conductive contact or "blade" that is locked or otherwise secured to a distal electrical terminal during operation to ensure that the components remain in contact. Relatively large forces must be established and overcome to move the blade into a locking position to assure a stable conductive connection.

Some previous designs provided blades that could be closed by exerting relatively low forces. In some of these designs, rotating an operating mechanism (e.g., and elongated shaft extending to the ground) would first cause the blade to pivot and enter the distal electrical terminal. Continued rotation of the operating mechanism would then pivot the blade about its longitudinal axis and into contact with the electrical terminal to establish the electrical connection.

These low-closing force switches are not without drawbacks, however. In particular, the blades of previous low-closing force switches are capable of pivoting about their longitudinal axis prematurely. There are two common ways in which this can occur. First, and when opening the switch, if the blade is rotated quickly and stopped suddenly, the momentum of the blade will overcome the force applied by springs to hold the blade in its open contact position (i.e., its rotational orientation about its longitudinal axis in which it does not contact the electrical terminal) and cause the blade to pivot about its longitudinal axis and stop in the closed contact position. Second, and when closing the switch, the blade may initially bounce off the distal electrical terminal and allow the blade to rotate about its longitudinal axis before it is properly seated in the electrical terminal. In both of these cases the switch cannot be subsequently closed using the operating mechanism.

Therefore, a need exists for an improved air break switch that addresses one or more of the above drawbacks of previous switch designs.

SUMMARY

According to an exemplary embodiment, an electrical switch includes a jaw assembly electrically connected to a first electrical conductor, a housing assembly electrically connected to a second electrical conductor and a blade assembly fixedly attached to the housing assembly at a first end thereof. The blade assembly has an electrically conductive blade contact fixedly attached to a second end distal from the first end. Further, the housing assembly and the blade assembly pivot about a first axis to drive the blade contact into the jaw assembly to close the switch and the blade assembly is operable to rotate about a second axis perpendicular to the first axis only when the distal end of the blade assembly is seated in the jaw assembly.

According to another embodiment an electrical switch includes a blade assembly with a rocker assembly having a first rocker component disposed at a distal end of the blade assembly and a second rocker component disposed at the end of the blade assembly proximate a housing assembly. The second rocker component is activated to enable rotation of the blade assembly in response to the first rocker component being activated.

According to another embodiment an electrical switch includes a blade assembly with a rocker assembly having a first rocker component disposed at a distal end of the blade assembly and a second rocker component disposed at the end of the blade assembly proximate a housing assembly. The second rocker component is activated to enable rotation of the blade assembly in response to the first rocker component being activated.

According to another embodiment an electrical switch including a jaw assembly, a housing assembly, a blade assembly, and a blade catch. The jaw assembly is electrically connected to a first electrical conductor. The housing assembly is electrically connected to a second electrical conductor. The blade assembly is fixedly attached to said housing assembly at a first end thereof and having an electrically conductive blade contact fixedly attached to a second end distal from said first end. The housing assembly and said blade assembly pivot about a first axis to drive said blade contact into said jaw assembly to close said switch. The blade assembly is operable to rotate about a second axis perpendicular to said first axis only when said distal end of said blade assembly is seated in said jaw assembly. The blade catch is disposed on the distal end of said blade assembly and engaging said jaw assembly to maintain said switch in the closed position when said blade assembly is rotated about said second axis.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
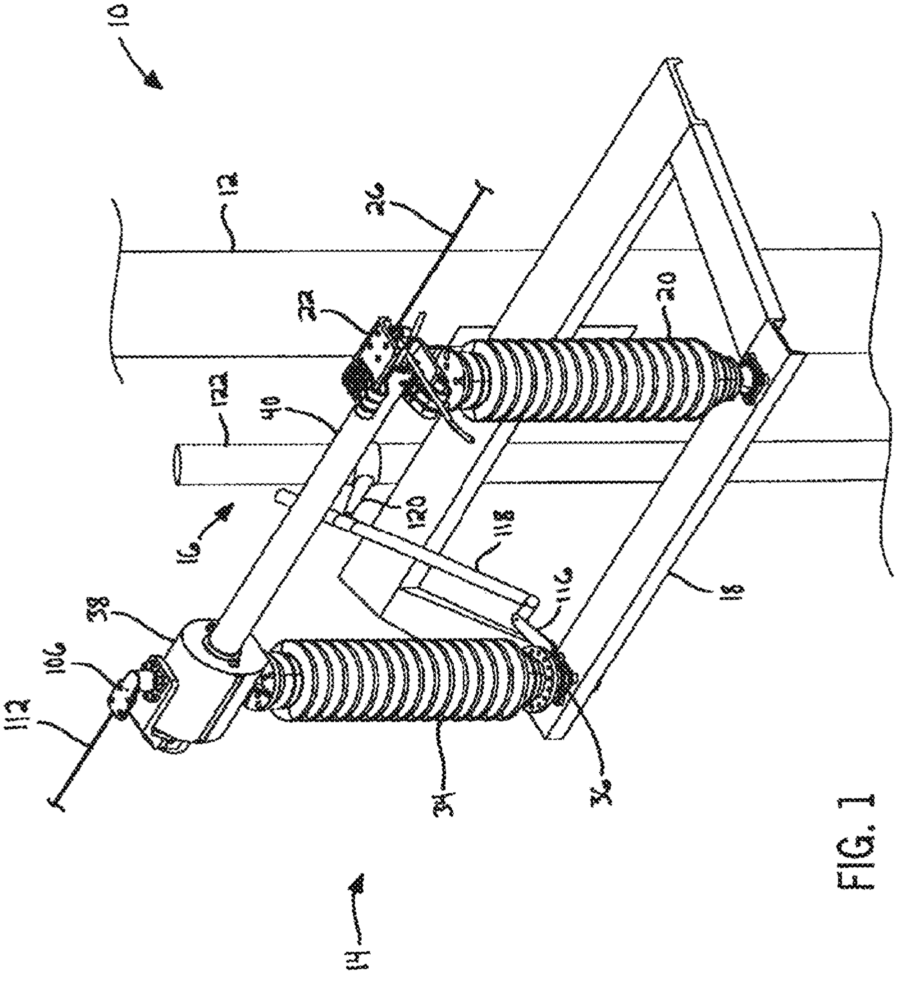
FIG. 1 is a perspective view of a utility structure supporting an air break switch of the present application in a closed blade position and a closed contact position in which terminals of the switch are electrically connected.

Referring first to FIG. 1, a high voltage/high current electrical or air break switch 10 of the present application may be supported by many types of appropriate utility structures, such as a utility pole 12. In general, the switch 10 includes one or more upper switches 14 disposed above the ground and an operating mechanism 16 extending from the upper switch 14 toward the ground. The operating mechanism 16 may be driven by an electrical technician on the ground to move the upper switch 14 between different operating positions. Unlike previous switch designs, the present switch 10 includes features that effectively inhibit a conductive blade 40 from prematurely pivoting to a position in which it is configured to contact a distal terminal. These aspects are described in further detail in the following paragraphs.

Referring to FIGS. 1-4, the general structure of the upper switch 14 will first be described. The upper switch 14 includes a support frame 18 fixedly connected to the utility pole 12. The support frame 18 mounts both stationary and pivotable switch components. Regarding the stationary switch components, a first end of the support frame 18 mounts a first elongated insulator 20. The first insulator 20 supports a first electrical terminal 22 above the frame 18 and, as such, the first electrical terminal 22 is electrically isolated from the frame 18.

Referring now to FIGS. 2-6, the first electrical terminal 22 includes a conductor contact 24 for connection to another electrical conductor, such as a transmission wire 26 (FIG. 1). The electrical terminal 22 also includes one or more terminal contacts 28. The terminal contacts 28 are preferably arranged in upper and lower pairs and each contact 28 in a pair is spring-biased toward the other contact 28 in the pair. The function of the terminal contacts 28 is described in further detail below. A lock bracket 30 (FIGS. 4 and 5) is disposed between the pairs of the terminal contacts 28. The function of the lock bracket 30 is also described in further detail below.

The first electrical terminal 22 may also include a first arcing arm 32 (FIGS. 4-6) to prevent electrical arcing at the terminal contacts 28. Furthermore, the first electrical terminal 22 may also support a load interrupter (not shown), such as the load interrupter described in U.S. Pat. No. 4,492,835, the disclosure of which is hereby incorporated by reference in its entirety, or one commercially available from Turner Electric Company, Edwardsville, IL The first electrical terminal 22 may also support a corona shield (not shown).

Returning to FIGS. 1-4 and regarding the pivotable switch components, the support frame 18 also mounts a second elongated insulator 34 opposite the first insulator 20. The second insulator 34 is pivotably connected to the support frame 18, e.g., via a bearing assembly 36. Furthermore, the second insulator 34 also connects to the operating mechanism 16 and is pivoted thereby as described in further detail below. The second insulator 34 mounts a blade support 38 and an electrically conductive tubular blade 40 that is pivotable to selectively provide an electrical connection with the first electrical terminal 22.

Rotating the operating mechanism 16 pivots the second insulator 34 about a vertical axis. As such, the operating mechanism 16 pivots the blade 40 from a closed blade position (FIG. 1) to an open blade position (FIG. 3) and vice versa. Specifically, pivoting the operating mechanism 16 in a first direction (i.e., clockwise as viewed from above) drives the blade 40 toward the closed blade position, and pivoting the operating mechanism 16 in a second direction (i.e., counter-clockwise as viewed from above) drives the blade 40 toward the open blade position.

Figure 5:
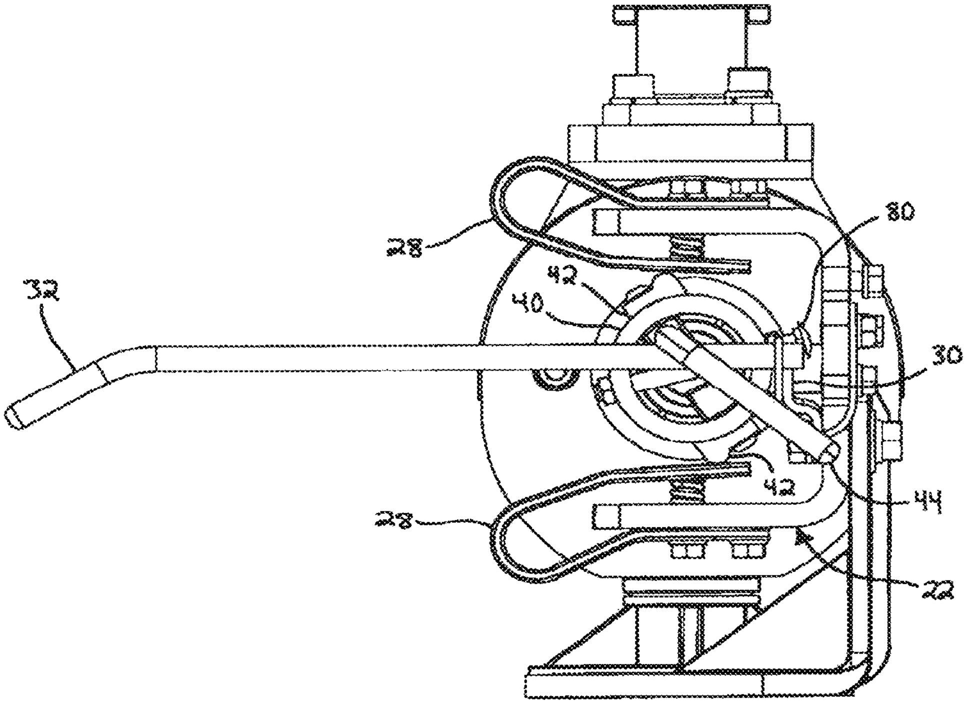
FIG. 5 is aside view of the air break switch moving toward the open contact position.
Figure 6:
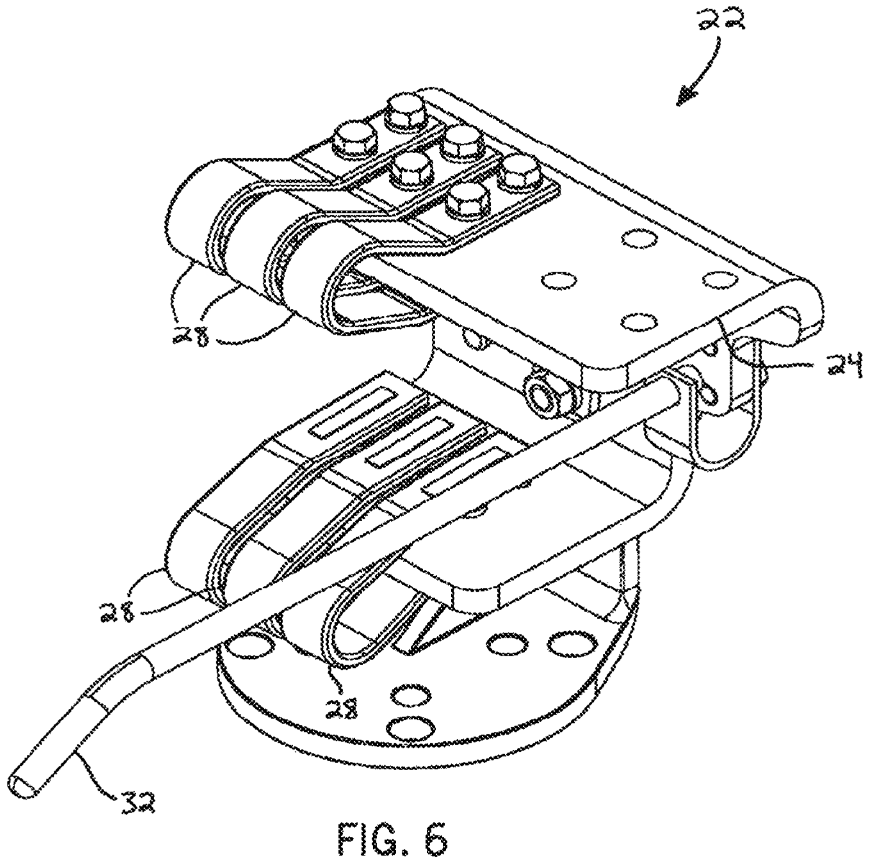
FIG. 6 is a perspective view of one of the electrical terminals of the air break switch.
Figure 7:
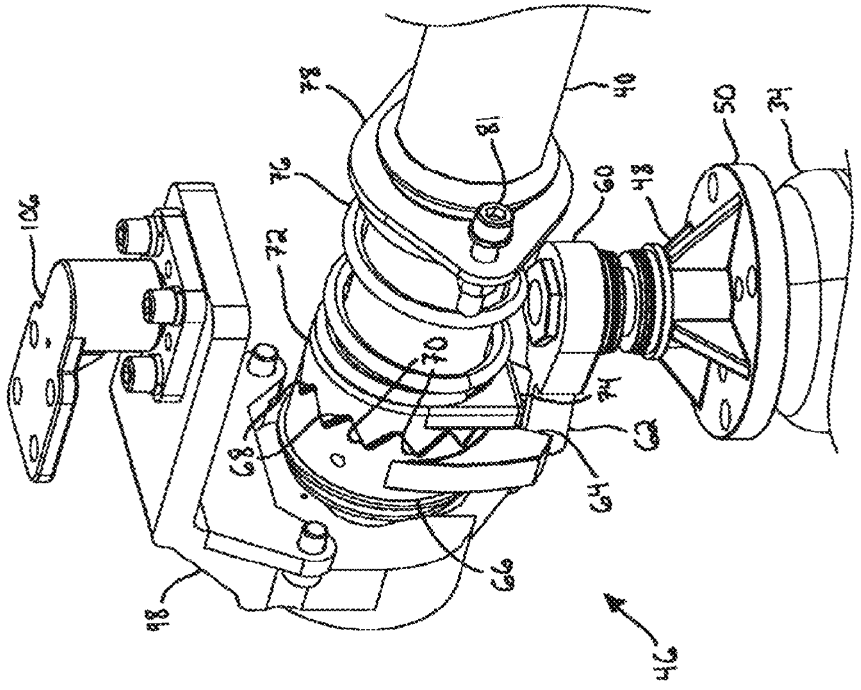
FIG. 7 is a perspective view of a toggle mechanism of the switch in the closed contact position of FIG. 1 with a blade support housing removed for clarity.

Referring now to FIGS. 1, 4, 5 and 7-10, the blade support 38 mounts the blade 40 such that the blade 40 is pivotable about its longitudinal axis from a closed contact position (FIG. 4) to an open contact position (the blade 40 is shown moving toward the open contact position in FIG. 5) and vice versa. As the name implies, in the closed contact position contacts 42 on the end of the blade 40 proximate the first electrical terminal 22 engage the terminal contacts 28 to electrically connect the first terminal 22 and the blade 40. Conversely, in the open contact position the blade contacts 42 disengage the terminal contacts 28, although the first electrical terminal 22 and the blade 40 may still be electrically connected by contact between the first arcing arm 32 and a second arcing arm 44 supported by the blade 40.

Figure 9:
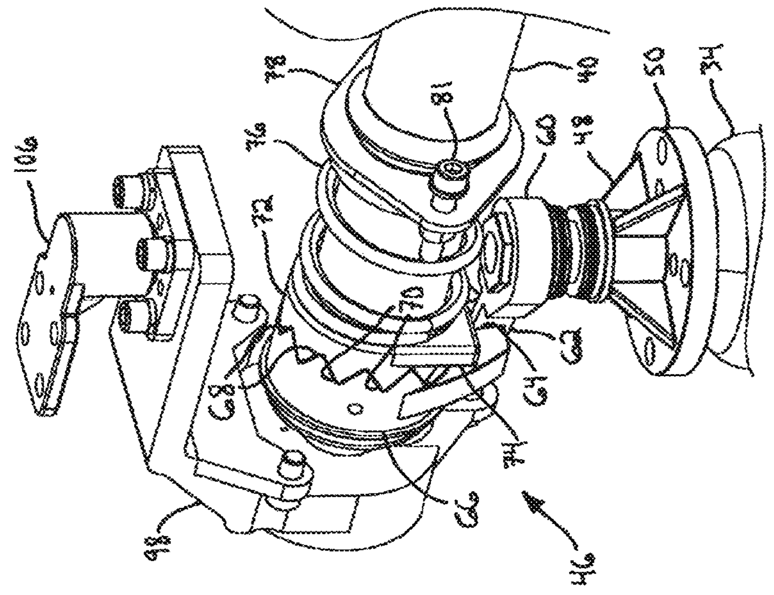
FIG. 9 is a perspective view of the toggle mechanism in the open contact position with the blade support housing removed for clarity.
Figure 10:
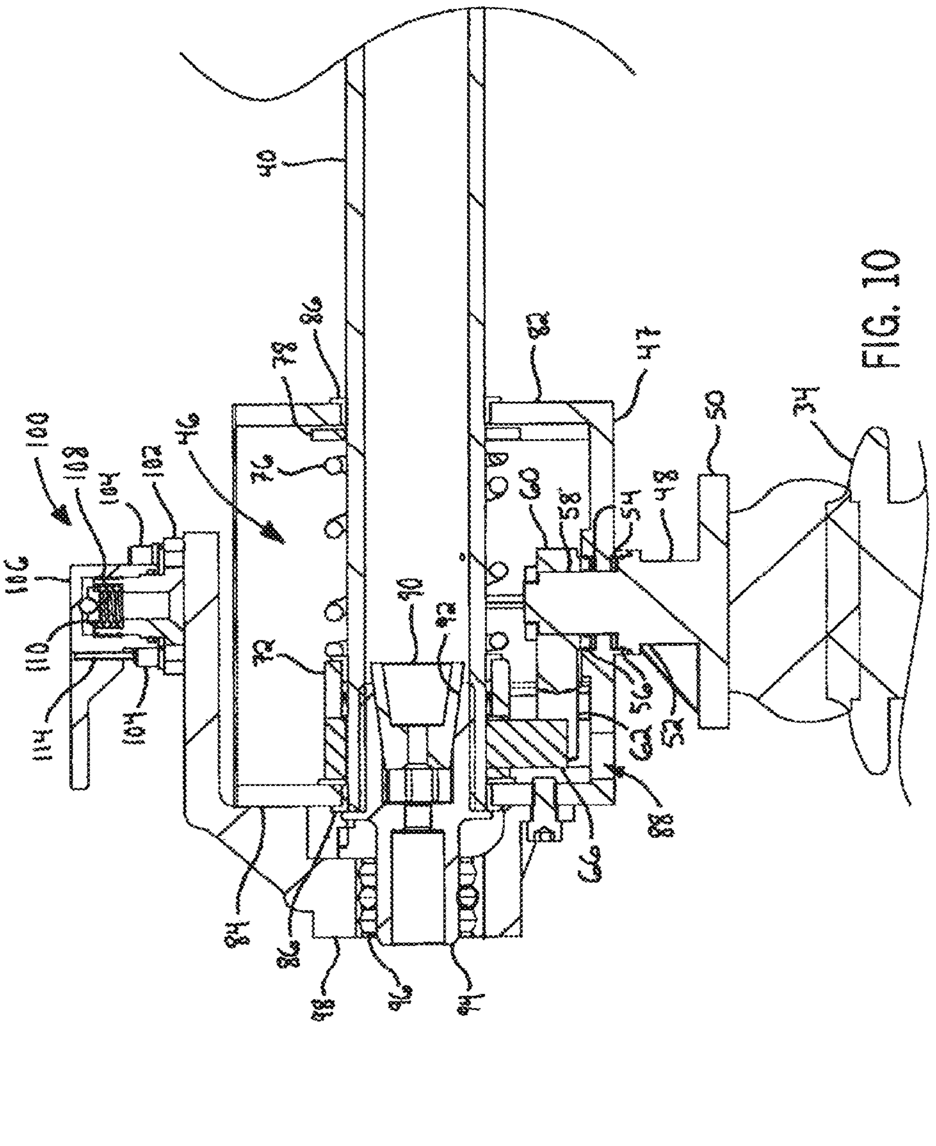
FIG. 10 is a sectional view of the toggle mechanism and the blade in the open contact position.
Figure 11:
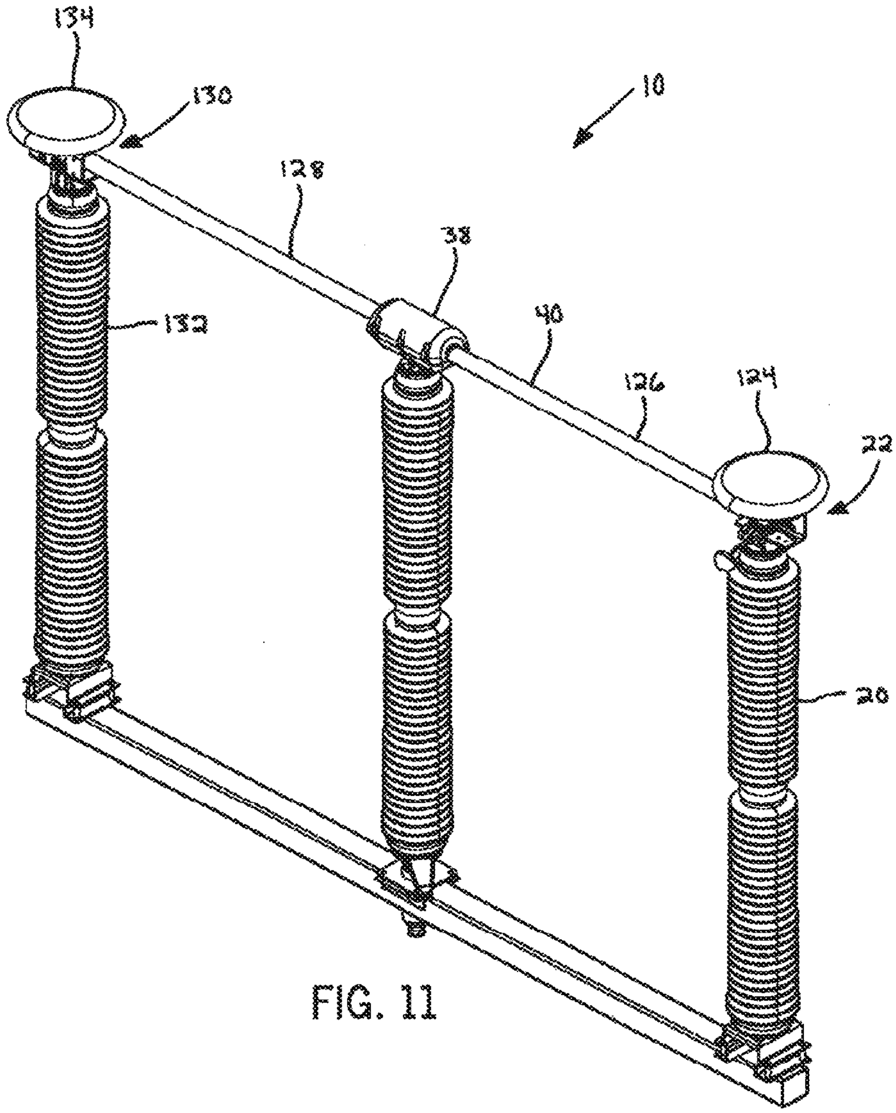
FIG. 11 is a perspective view of a second embodiment of the air break switch of the present application in a closed blade position and a closed contact position.
Figure 12:
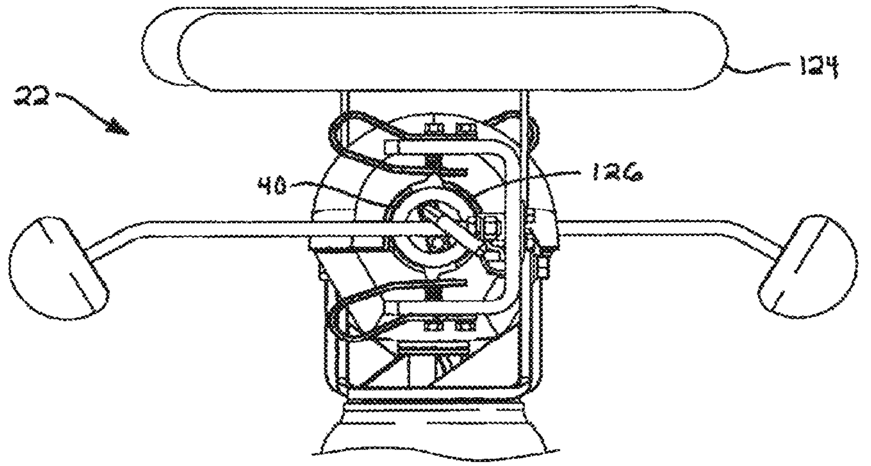
FIG. 12 is a side view of the air break switch of FIG. 11 illustrating a first electrical terminal.
Figure 13:
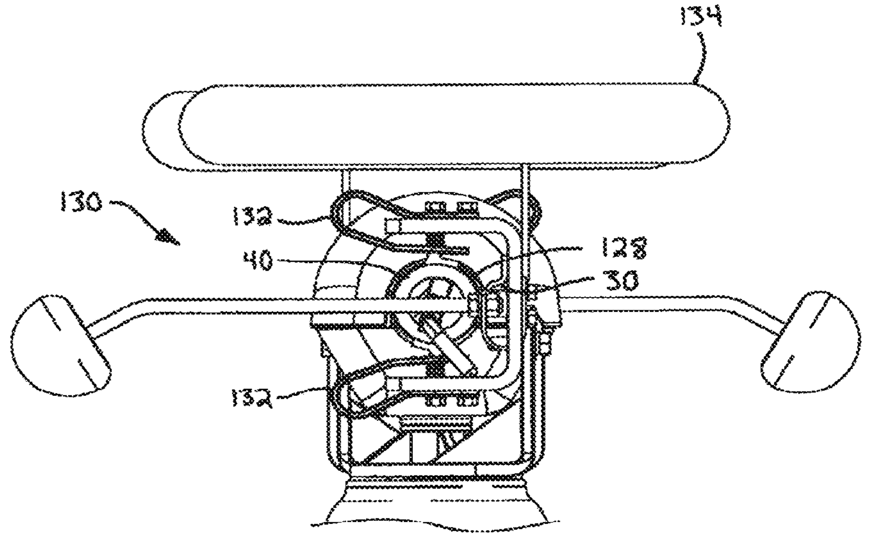
FIG. 13 is a side view of the air break switch of FIG. 11 illustrating a second electrical terminal opposite the first electrical terminal.
Figure 14:
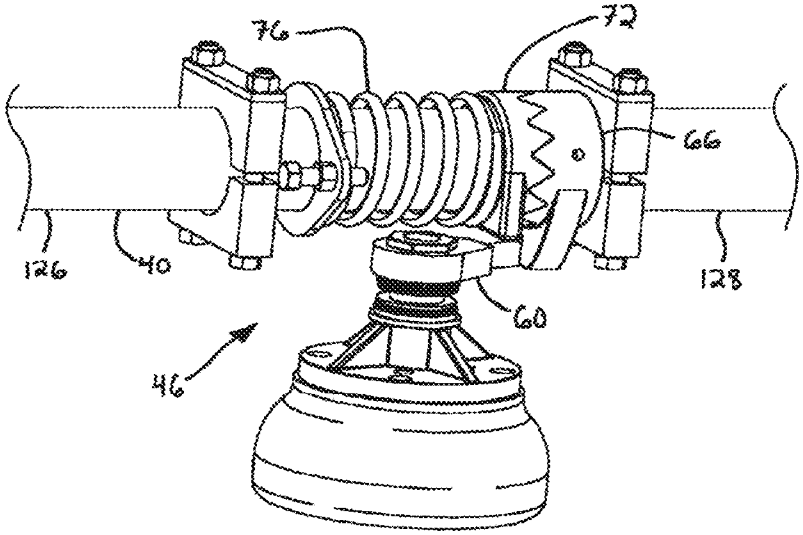
FIG. 14 is a perspective view of a toggle mechanism of the air break switch of FIG. 11 with a blade support housing removed for clarity.
Figure 15:
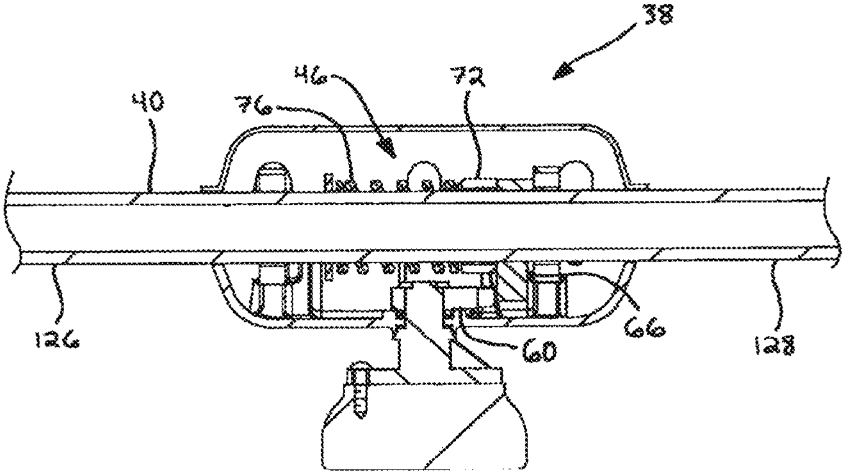
FIG. 15 is a sectional view of the toggle mechanism of FIG. 14 and a blade of the air break switch.

To facilitate the pivotal motion of the blade 40 described in the previous paragraph, the blade support 38 includes a toggle mechanism 46 (FIGS. 7-10) that connects to a blade support housing 47 (FIG. 10). The toggle mechanism 46 includes a rotator 48 fixedly connected to the second insulator 34, e.g., via fasteners (not shown) extending through a rotator mounting flange 50. As such, the rotator 48 pivots with the second insulator 34 when it is driven by the operating mechanism 16. The rotator 48 also includes a rotator coupling section 52 (FIG. 10) above the mounting flange 50. The rotator coupling section 52 supports two bearings 54 and seals 56 and, as such, the rotator coupling section 52 rotatably supports the blade support housing 47. In addition, the rotator 48 includes a keyed coupling section 58 (FIG. 10) above the rotator coupling section 52. The keyed coupling section 58 engages a cam or toggle lever 60 via one or more keys (not shown), and as such, the toggle lever 60 pivots with the rotator 48 and the second insulator 34 when they are driven by the operating mechanism 16.

The toggle lever 60 includes a pin 62 that extends away from the first electrical terminal 22. The pin 62 engages a slot 64 (FIG. 7) of a first toggle or over-center member 66 that fixedly surrounds the blade 40 and connects thereto, e.g., via fasteners (not shown). The first toggle member 66 has a crown shape with a first set of crown points 68 disposed at one end. The first set of crown points 68 engages and interdigitates with a second set of crown points 70 of a second toggle or over-center member 72. The second toggle member 72 is translatably and pivotally supported by the blade 40; however, the second toggle member 72 includes a flange 74 that contacts an interior wall of the blade support housing 47 to inhibit the second toggle member 72 from rotating relative to the housing 47. The second toggle member 72 is also biased into engagement with the first toggle member 66 by a compression spring 76 disposed between the second toggle member 72 and a housing bracket 78. The interactions between the first toggle member 66, the second toggle member 72, and the spring 76, and their effect on motion of the blade 40, are described in further detail in the following paragraph.

Figure 2:
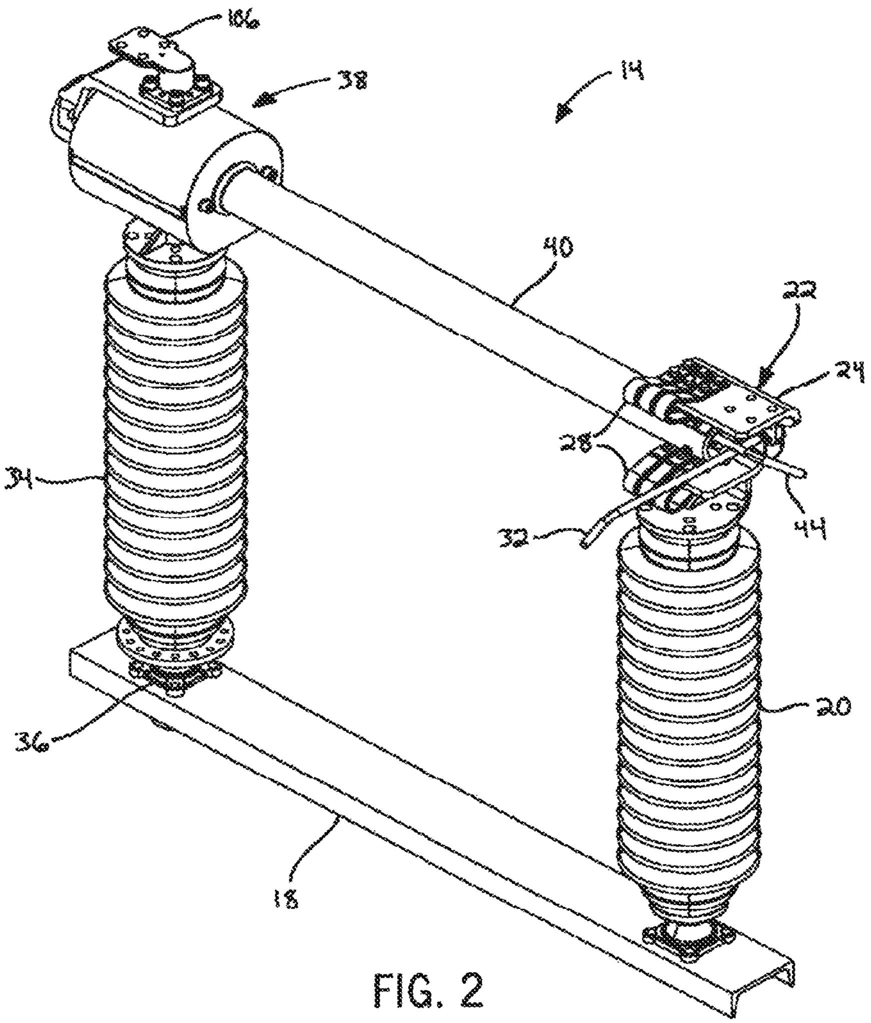
FIG. 2 is a perspective view of the air break switch of FIG. 1 with the blade pivoting to an open contact position in which the terminals are still electrically connected.
Figure 3:
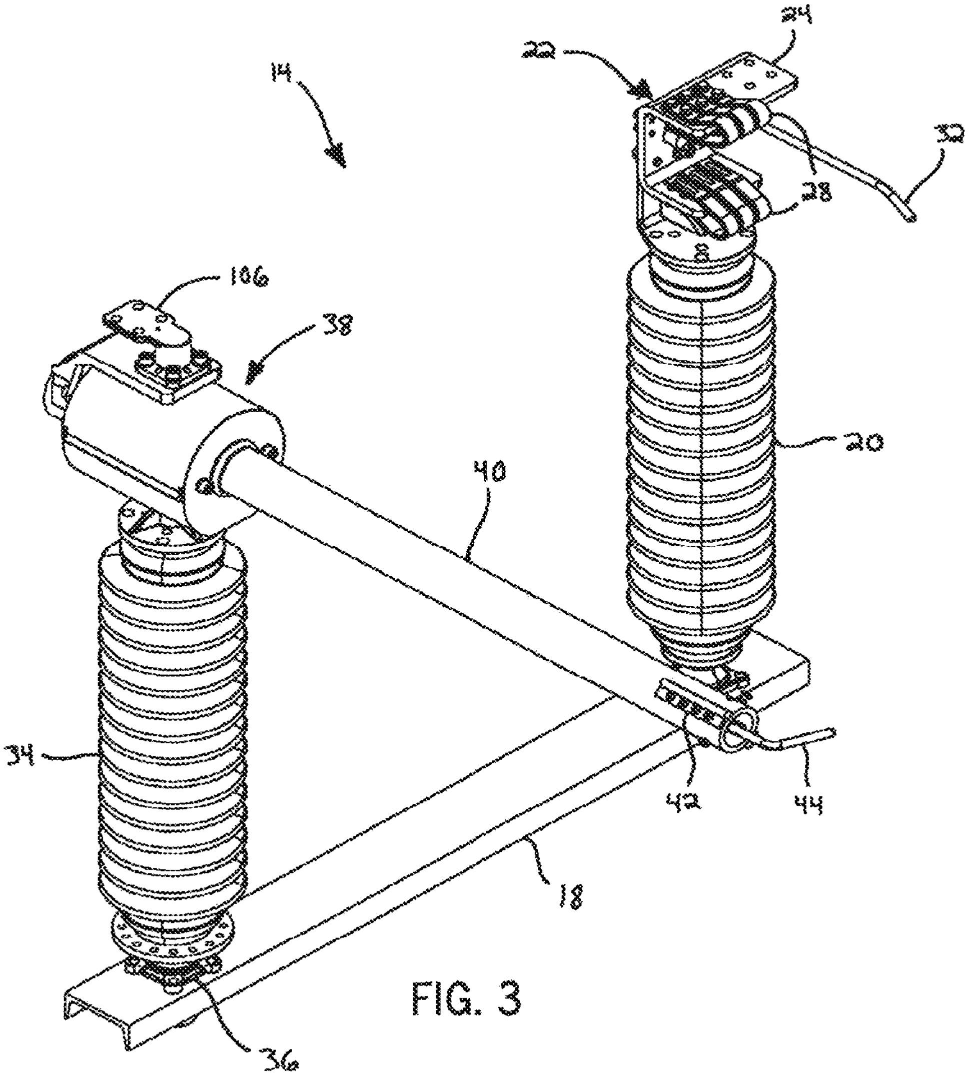
FIG. 3 is a perspective view of the air break switch of FIG. 1 with the blade pivoted to an open blade position in which the terminals are electrically isolated.
Figure 4:
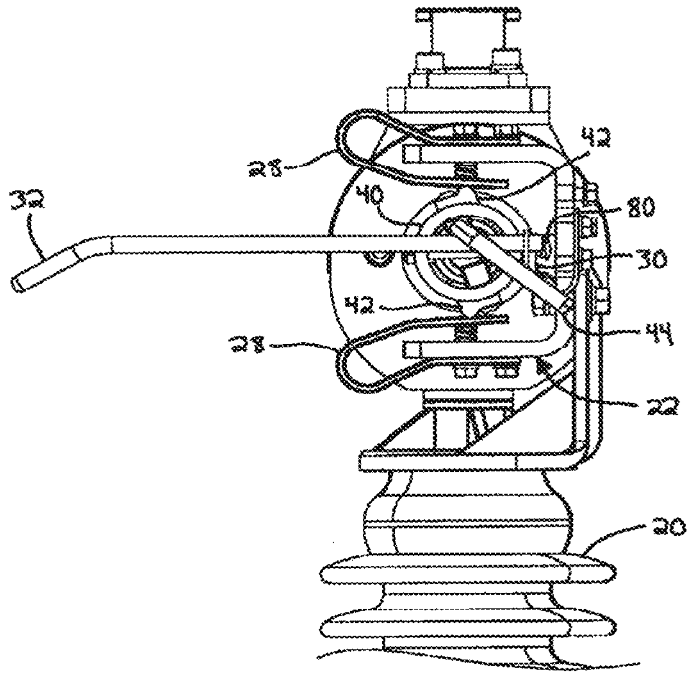
FIG. 4 is aside view of the air break switch in the closed blade position and closed contact position of FIG. 1.
Figure 8:
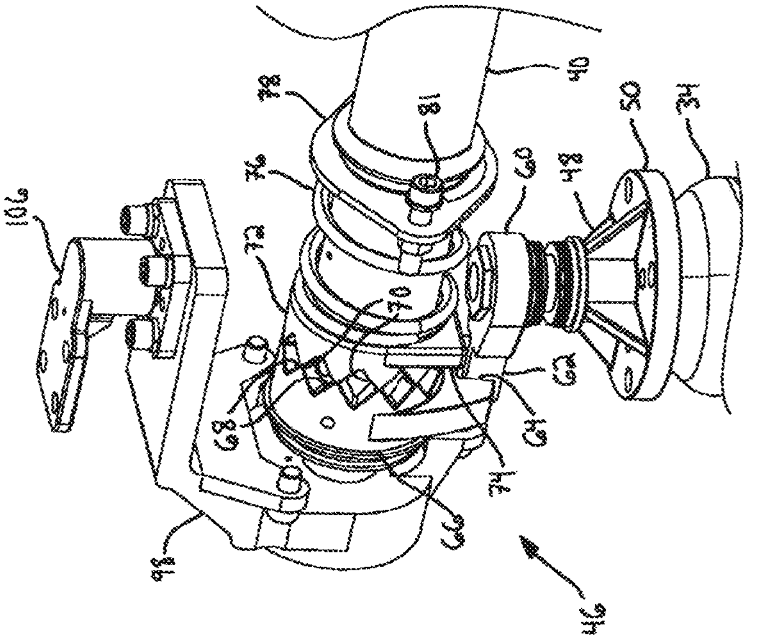
FIG. 8 is a perspective view of the toggle mechanism moving toward the open contact position with the blade support housing removed for clarity.

If the blade 40 is in the open blade position and the open contact position (i.e., the configuration shown in FIG. 3), clockwise motion of the operating mechanism 16 tends to pivot the toggle lever 60 (FIG. 9) in a counter-clockwise direction. This motion of the toggle lever 60 tends to pivot the first toggle member 66 and the blade 40 about both the vertical axis (about which the toggle lever 60 pivots) and the longitudinal axis of the blade 40. However, the torque needed to pivot the first toggle member 66 and the blade 40 about its longitudinal axis is relatively high due to the pivotally fixed relationship of the second toggle member 72 to the blade support housing 47, engagement of the first and second sets of crown points 68 and 70, and the spring 76. The torque needed to pivot the first toggle member 66 and the blade 40 about the vertical axis is relatively low and, as such, the blade 40 first pivots to the closed blade position (FIG. 2). Upon reaching the closed blade position, the torque needed to pivot the blade 40 about the vertical axis increases significantly due to contact between the blade 40 and the first electrical terminal 22. As such, continued clockwise motion of the operating mechanism 16 causes the first toggle member 66 and the blade 40 to pivot about the longitudinal axis as the first set of crown points 68 slip over the second set of crown points 70 (FIG. 8). After the crown points 68, 70 pass "over center" (i.e., past a position in which the tips contact each other), the spring 76 forces the second toggle member 72 toward the first toggle member 66. This action causes the first and second crown points 68, 70 to interdigitate in a configuration (FIG. 7) different than the previous configuration. In addition, the blade contacts 42 engage the terminal contacts 28 (i.e., the blade 40 enters the closed contact position).

A simple latching mechanism inhibits the blade 40 from returning directly to the open blade position (FIG. 3) after entering the closed contact position. In particular and as shown most clearly in FIGS. 4 and 5, the latching mechanism includes a bolt 80 supported at the same end of the blade 40 as the blade contacts 42. The shank of the bolt 80 is sized to enter a slot of the lock bracket 30 of the first terminal 22 as the blade 40 pivots to the closed contact position. However, the head of the bolt 80 is oversized relative to the slot. As such, the bolt 80 engages the bracket 30 and thereby inhibits the blade 40 from pivoting about the vertical axis (i.e., toward the open blade position) before it pivots about its longitudinal axis.

To return the blade 40 to the open contact position and the open blade position, the operating mechanism 16 is pivoted in a counter-clockwise direction to pivot the toggle lever 60 (FIG. 7) in a clockwise direction. This motion of the toggle lever 60 tends to pivot the first toggle member 66 and the blade 40 about both the vertical axis and the longitudinal axis of the blade 40. However, the blade 40 does not immediately pivot about the vertical axis due to engagement of the bolt 80 and the lock bracket 30 as described above. As such, the first toggle member 66 and the blade 40 first pivot about the longitudinal axis as the first set of crown points 68 slip over the second set of crown points 70 (FIG. 8). After the crown points 68, 70 pass over center, the spring 76 forces the second toggle member 72 toward the first toggle member 66. This action causes the first and second crown points 68, 70 to interdigitate in their original configuration (FIG. 9). In addition, the blade contacts 42 disengage the terminal contacts 28 (i.e., the blade 40 enters the open contact position) and the bolt 80 disengages the lock bracket 30. As such, continued counter-clockwise motion of the operating mechanism 16 pivots the blade 40 about the vertical axis (i.e., toward the open blade position).

In order to ensure the toggle mechanism 46 does not force the blade 40 to return to the closed contact position when the operating mechanism 16 is pivoted in a counter-clockwise direction, the spring-biased terminal contacts 28 preferably remain in engagement with the blade contacts 42 until the toggle mechanism 46 passes over center. That is, friction between the terminal contacts 28 and the blade contacts 42 holds the blade 40 in the closed blade position until the blade 40 pivots from the closed contact position and the toggle mechanism 46 passes over center. Conversely, if the terminal contacts 28 were to disengage the blade contacts 42 before the toggle mechanism 46 passed over center, the blade 40 would begin to pivot vertically due to motion of the operating mechanism 16, but the second toggle member 72 and the compression spring 76 would force the blade 40 to pivot back to the closed contact position.

The spring constant of the compression spring 76 may be selected to provide an appropriate torque threshold to be exceeded to pivot the blade 40 about its axis. An appropriate torque threshold is higher than the torque needed to pivot the blade 40 about the vertical axis but preferably not so high that an operator cannot easily apply the torque to the operating mechanism 16. Additionally, the housing bracket 78 may be adjustable (e.g., by turning fasteners 81) to vary the force applied by the second toggle member 72 to the first toggle member 66.

Referring now specifically FIG. 10, the remainder of the blade support 38 will be described. The blade support housing 47 includes front and rear walls 82 and 84 that pivotally support the blade 40 via bushings 86. The blade support housing 47 also includes a drain hole 88 that prevents moisture from accumulating within the blade support housing 47.

The blade 40 is attached internally to a blade end cap go. A proximal portion 92 of the blade end cap go is outwardly expandable to ensure that the blade end cap go and the blade 40 remain in contact and electrically connected. A distal portion 94 of the blade end cap go is surrounded and contacted by one or more current transfer springs 96. The current transfer springs 96 are disposed within a terminal support 98.

The terminal support 98 mounts a second electrical terminal 100 above the blade support housing 47. The second electrical terminal 100 includes a terminal mounting 102 that fixedly connects to the terminal support 98 via fasteners 104. The terminal mounting 102 pivotally supports a conductor contact 106 via a threaded connection 108. A compression spring 110 disposed within the terminal mounting 102 biases the conductor contact 106 to ensure the terminal mounting 102 and the conductor contact 106 remain in contact and electrically connected through the threaded connection 108. The conductor contact 106 is pivotable relative to the terminal mounting 102 via the threaded connection 108 to reduce stress on another electrical conductor, such as a transmission wire 112 (FIG. 1), connected to the conductor contact 106. However, the range of motion of the conductor contact 106 is limited by a pin 114 that contacts the fasteners 104.

Referring again to FIG. 1, the operating mechanism 16 will now be briefly described in further detail. The operating mechanism 16 includes a bracket 116 fixedly connected to the second insulator 34. The bracket 116 pivotally connects to and is driven by an elongated link 118. The elongated link 118 pivotally connects to and is driven by a short link 120. The short link 120 fixedly connects an elongated vertical shaft 122 that extends from the upper switch 14 toward the ground.

The switch 10 may comprise appropriate materials recognized by those skilled in the art. For example, the blade 40 may comprise aluminum and the terminals 22 and 100 and the blade support 38 may comprise copper, silver-coated metals, or the like. The insulators 20 and 34 may comprise ceramics.

Referring now to FIGS. 11-15, a second embodiment of an air break switch 10 according to the present application is shown. The second embodiment of the switch 10 has similarities to the embodiment described above. For example, the switch 10 includes a first electrical terminal 22 supported by a first insulator 20. In addition to the components described above, the terminal 22 includes a corona shield 124. The first electrical terminal 22 electrically connects to a proximal end 126 of a blade 40 that is supported by a pivotable blade support 38. The blade support 38 also supports a toggle mechanism 46 that inhibits the blade 40 from pivoting to the closed contact position before pivoting to the closed blade position. To facilitate this motion of the blade 40, the toggle mechanism 46 includes a toggle lever 60 that pivots a first toggle member 66, and the first toggle member 66 slips relative to a second toggle member 72 as described above. In addition, the second toggle member 72 is biased toward the first toggle member 66 by an adjustable compression spring 76.

Unlike the embodiment described above, however, the blade support 38 does not support a second electrical terminal. Instead, a distal end 128 of the blade 40 extends away from the first electrical terminal 22 and toward a second electrical terminal 130 supported by a third insulator 132. Besides facing the opposite direction to receive the distal end 128 of the blade 40, the second electrical terminal 130 is generally similar to the first electrical terminal 22 (e.g., the second electrical terminal 130 includes terminal contacts 132 and a corona shield 134). Furthermore, the lock bracket 30 on the second electrical terminal 130 faces downward. This construction is as such because, as viewed in FIGS. 12 and 13, the ends of the blade 40 rotate in opposite directions (although the ends 126, 128 of the blade 40 actually rotate in the same direction) to enter the closed contact position.

For both embodiments described above, it should be apparent that the electrical conductors (e.g., transmission wires 26 and 112) connected to the first and second electrical terminals are selectively electrically connectable by engaging and disengaging the blade from the first electrical terminal (in the case of the first embodiment) or both terminals (in the case of the second embodiment). Furthermore, the toggle mechanism inhibits the blade from pivoting about its own axis before pivoting proximate the first electrical terminal or both of the electrical terminals.

Referring to FIGS. 16-25 a further embodiment of the application is disclosed.

Figure 16:
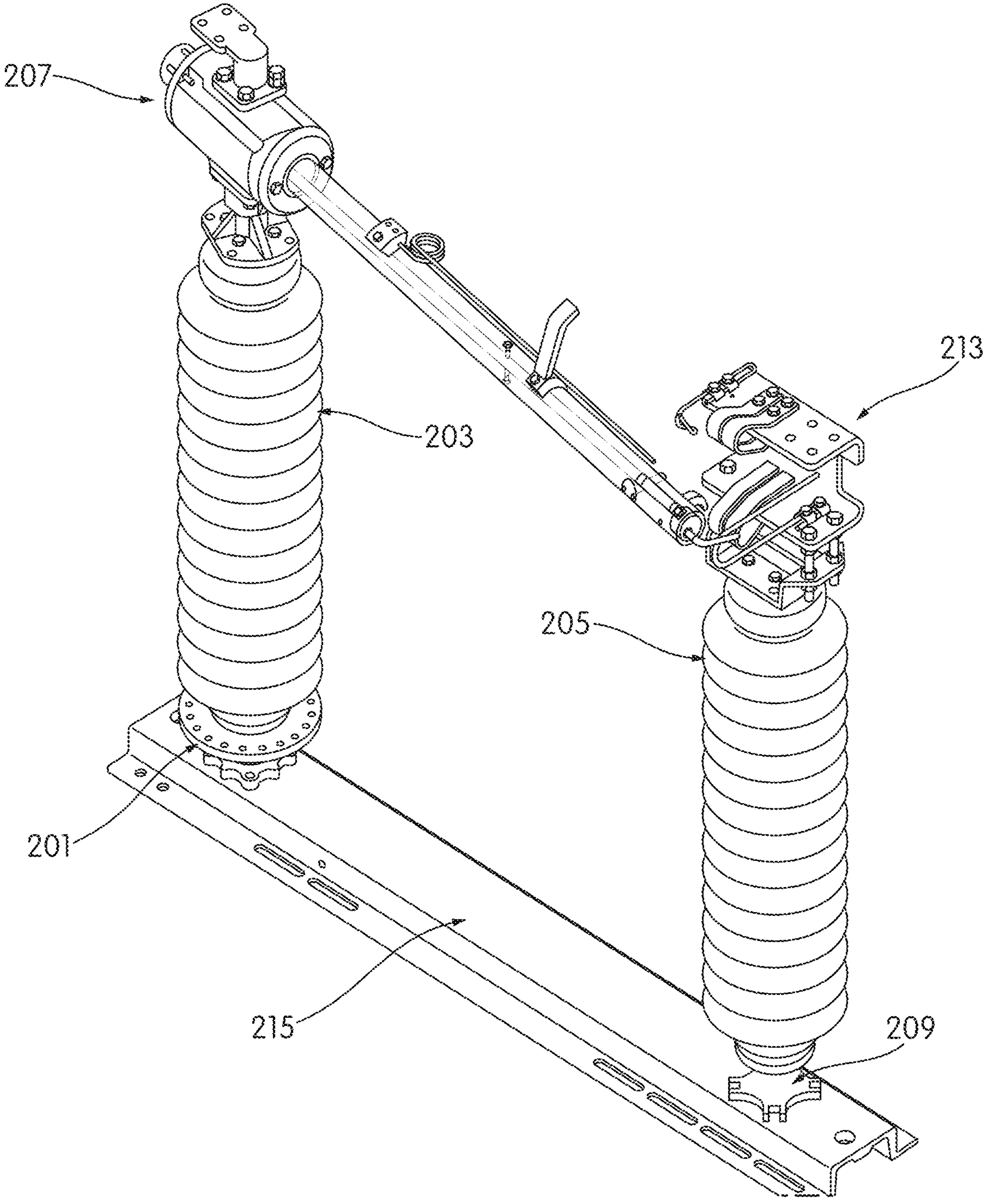
FIG. 16 is a perspective view of a third embodiment of the air break switch of the present application.

According to the embodiment shown in FIG. 16, pivot 201 allows rotation for insulator 203 under the housing assembly 207. Pedestal 209 mounts insulator 205 under the jaw assembly 213 to the base 215 and prevents rotation.

Housing assembly 301, according to this embodiment, is an aluminum cylinder disposed above insulator 203 and encloses the mechanism components, discussed in greater detail below. A terminal pad assembly includes flange 303 which bolts to the housing and conductor contact 305 which threads onto flange 303. This creates a current path from the housing to the bus work leading up to the switch.

Figure 17:
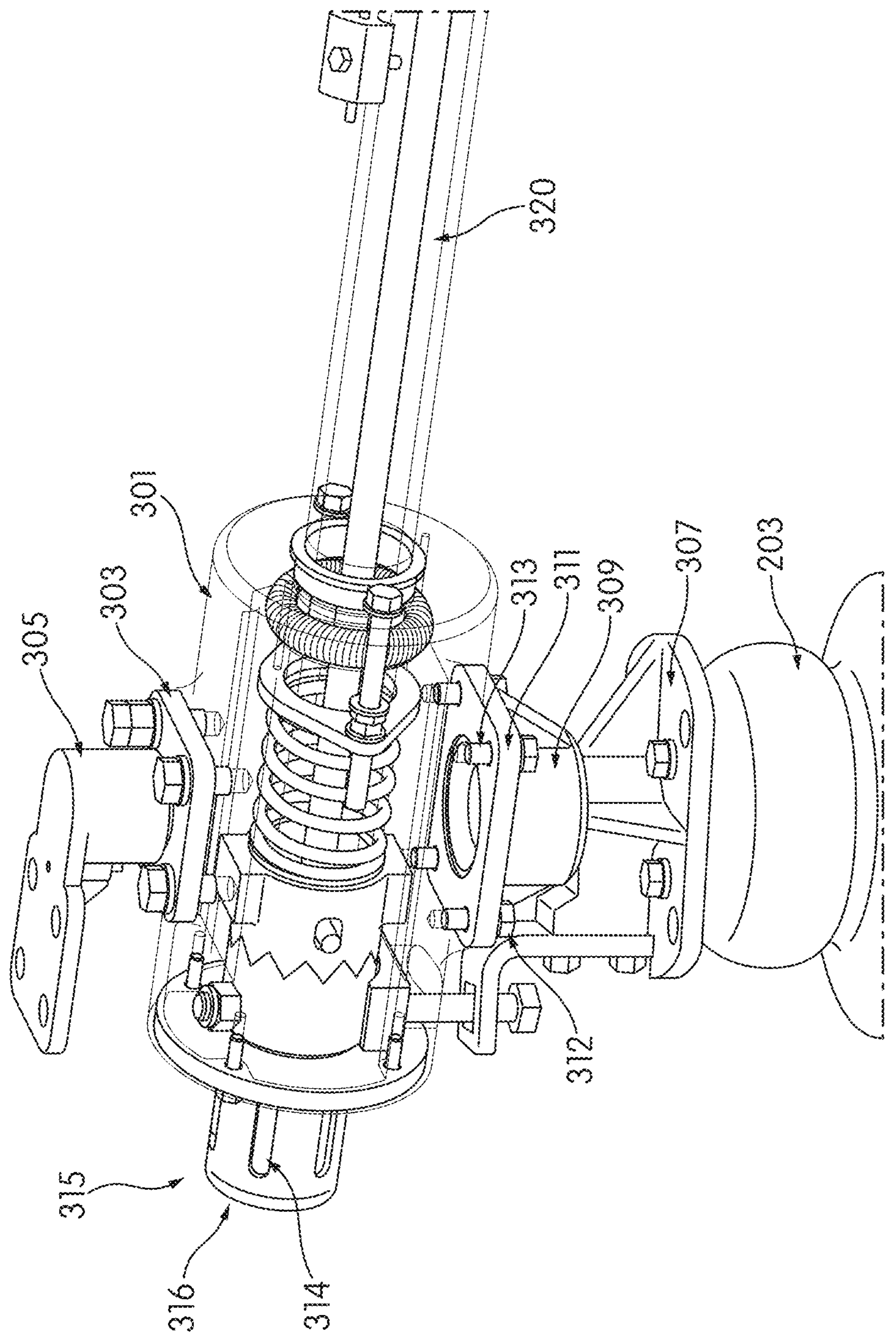
FIG. 17 is a perspective view of a housing assembly in accordance with an embodiment of the switch shown in FIG. 16.

Referring to FIG. 17, a rotator assembly includes mounting flange 307 which attaches to the insulator 203. For example, flange 307 is bolted to insulator 203 with a 3-inch bolt circle or a 5-inch bolt circle depending on the size of the switch. Lever 309 is attached to flange 307, for example, using a 1¼" bolt. To enable the rotator assembly to rotate freely, one or more sets of needle bearings (not shown) are employed within the rotator assembly. As shown housing 301 mounts to the top of lever 309 via flange 311, for example, using bolts 312. A rotator gasket 313, made of rubber in accordance with the present embodiment, mounts between the rotator assembly and the housing. This prevents moisture from ingressing into the needle bearings within the rotator assembly.

On one end of the housing assembly 301 an indicator assembly 315 is disposed. The indicator assembly includes a visual indicator, such as sticker 314 with green and red stripes that wraps around the blade 320 and an aluminum casting 316 that mounts to the back of the housing. In the embodiment shown, blade 320 is a 2-inch aluminum tube that runs through the center of the housing 301. The blade carries current between the jaw assembly, discussed in greater detail below, and the housing assembly. Casting 316 has slots in it so that only one of the colors of the sticker 314 will be displayed at any one given time, for example, red when the switch is closed and green when the switch is open. For example, when blade 320 is rolled into the closed position, only the red portion of sticker 314 should be visible through the slots in casting 316. When blade 320 is rolled into the open position, only the green portion should be visible.

Figure 18:
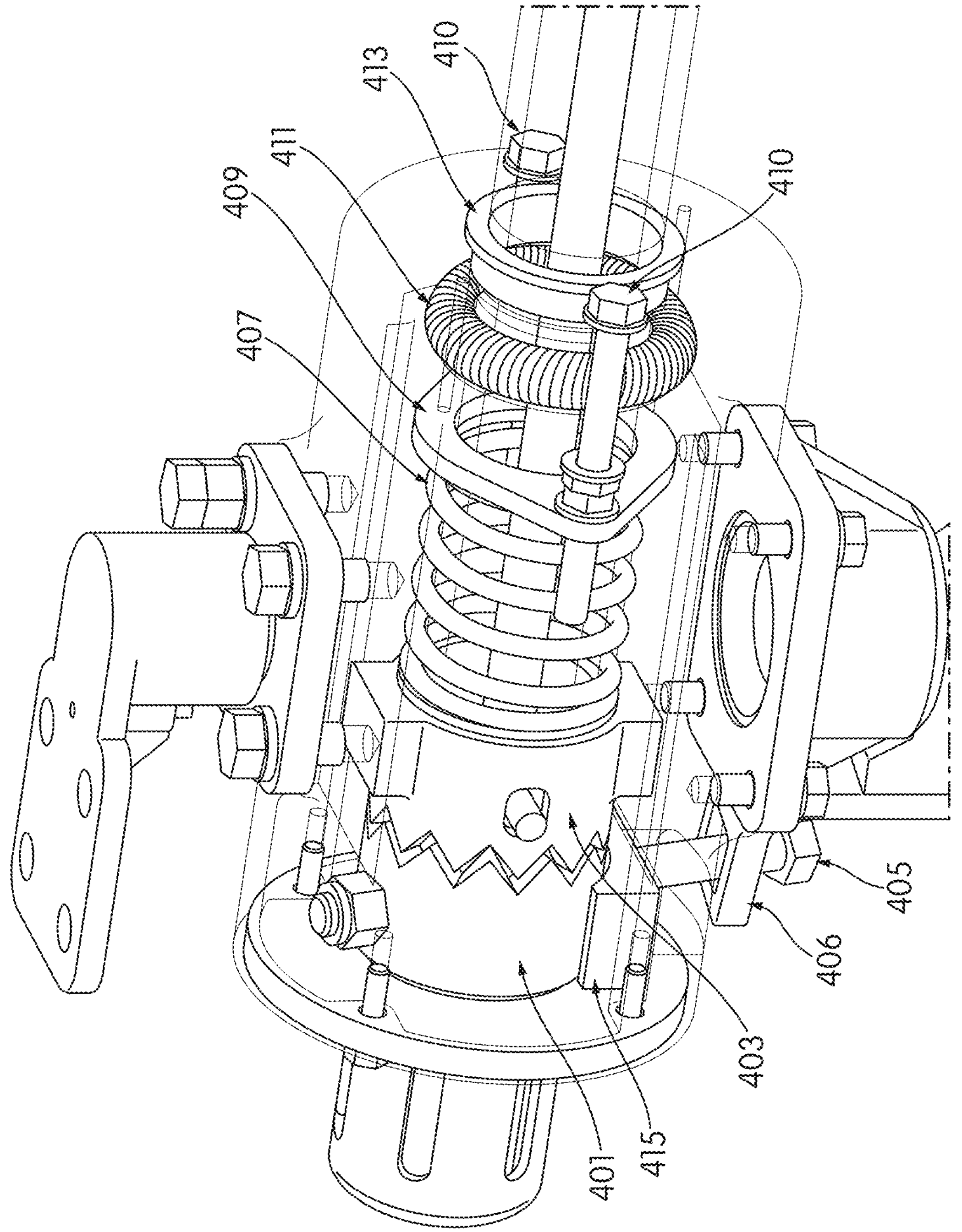
FIG. 18 is a perspective view showing various internal components, including the toggle mechanism, of the housing assembly shown in FIG. 17.

Referring to FIG. 18, a toggle mechanism within the housing includes first and second toggle members 401 and 403, respectively. First toggle member 401 is fixed to the blade by a drive bolt and is, thus rotated when the blade rotates. Second toggle member 403 is not connected to the blade and is constrained by the housing so that it is not able to rotate. Second toggle member 403 is only able to move axially along the length of the blade. Cooperating teeth in the first and second toggle members, 401 and 403, force the blade to settle in either a full open or full closed position.

A drive bolt 405, for example a ½" bolt, runs through the first toggle mechanism 401 and the blade. As shown the head of drive bolt 405 sticks out the bottom of the housing. A nut (not shown), such as a Nylock nut, is threaded on the end of the bolt within first toggle member 401 to hold it in the housing.

Drive lever 406 is attached, for example using an additional bolt, to the rotator flange and drive bolt 405 runs through a hole in the drive lever. When the rotator assembly rotates, the drive lever rotates the drive bolt which then rotates the toggle mechanism inside the housing.

One end of a toggle mechanism spring 407 applies a force to the toggle mechanism along the axis of the blade forcing the respective teeth of first and second toggle members 401 and 403 to engage in either the full open or closed position. A spring plate 409 abuts against the opposite end of spring 407 and is adjustably moved using adjustment bolts 410, which protrude through the housing, to regulate the amount of preload applied to the spring.

Canted coil spring 411 conducts electric current from the blade to the housing. Coil 411 is disposed within a tight groove in the interior of the housing and squeezes against the blade, creating a low resistance connection between the blade and housing. Front bushing 413, and a similar rear bushing at the back of the housing (not shown), keep the blade concentric within the housing. A bug guard 415 is made of plastic and prevents insects and other small matter from entering the housing in the area proximate where drive bolt 405 enters the housing.

Figure 19:
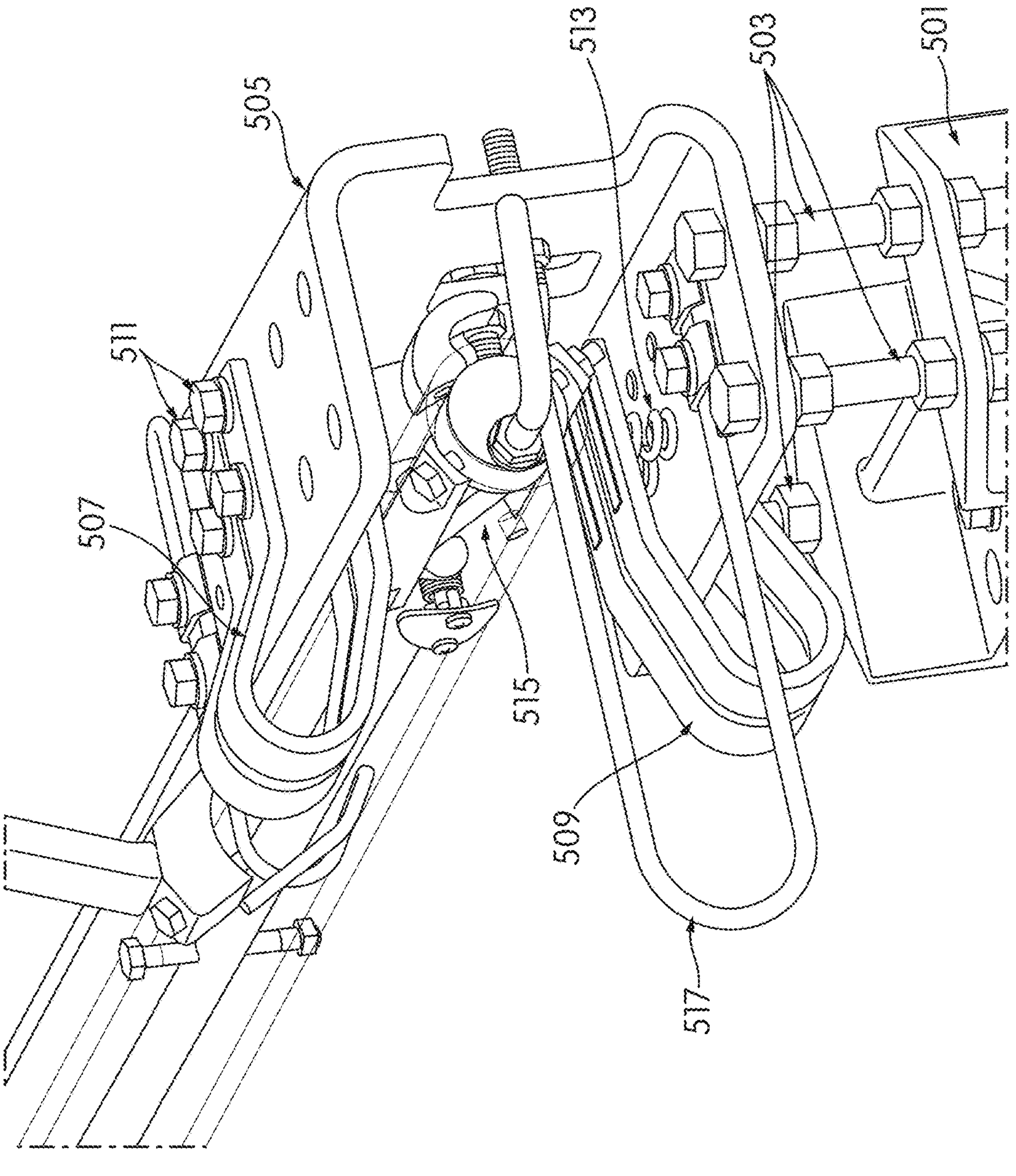
FIG. 19 is a perspective view of a jaw assembly in accordance with an embodiment of the switch shown in FIG. 16.

Referring to FIG. 19, one exemplary embodiment of jaw assembly 213 will be described.

Jaw support 501 mounts to the insulator, for example, using a 3-inch or 5-inch bolt circle. The jaw bracket 505 then mounts to the jaw support 501 using 3 jaw adjustment bolts 503. The components of the jaw assembly, in turn, mount to the jaw bracket. The three jaw adjustment bolts 503 are used to level the jaw bracket 505. The jaw is adjusted so that the blade assembly makes correct contact with the jaw assembly when opening and closing.

Figure 20:
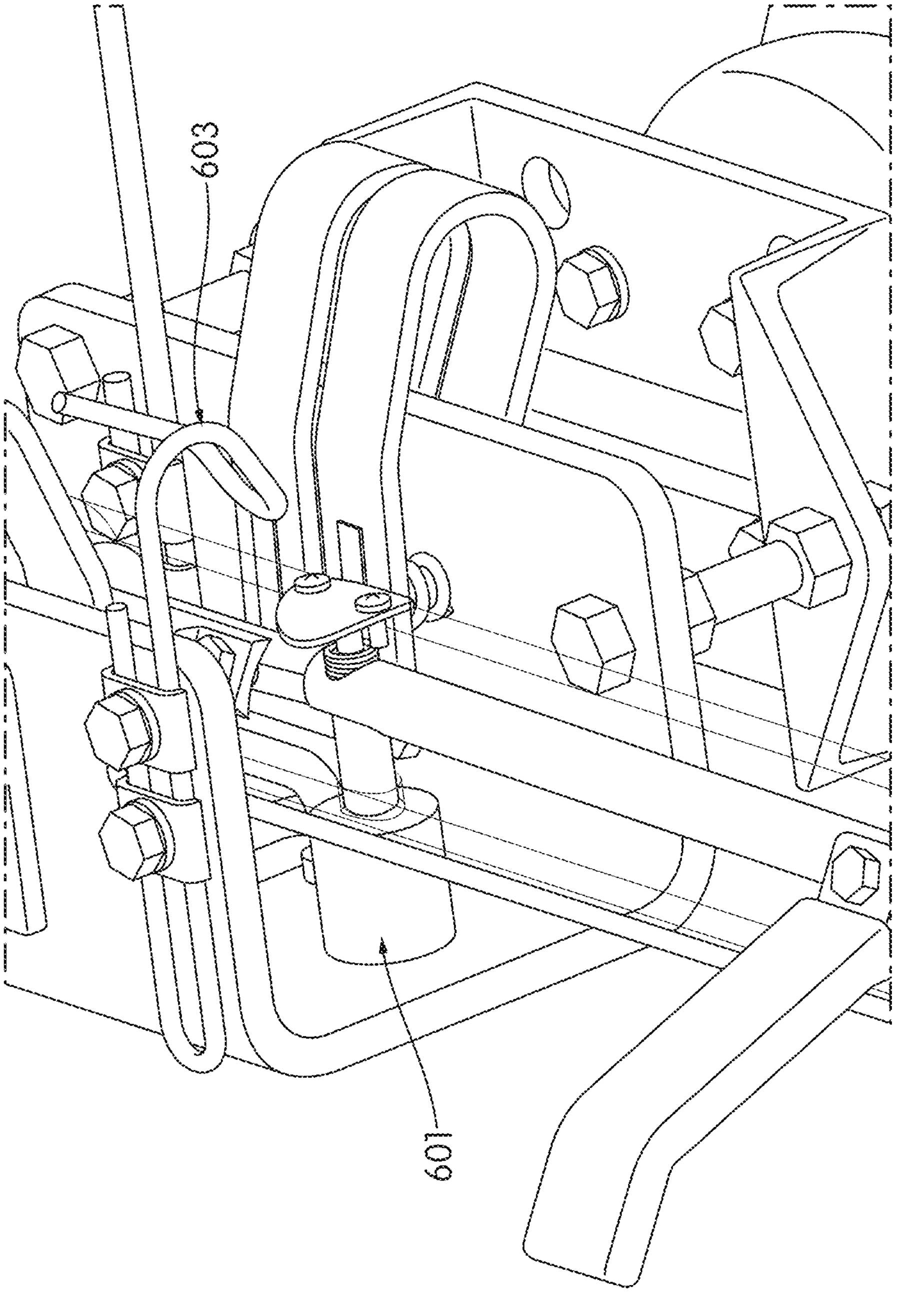
FIG. 20 is a perspective view showing various components of the jaw assembly shown in FIG. 19.

Referring to FIG. 20, top and bottom contact fingers 507 and 509, respectively, are mounted to the jaw bracket 505. As shown, top contact fingers 507 are attached to jaw bracket 505 using four bolts 511. When the blade is in the closed position, the contact fingers conduct the current from the blade assembly to the jaw bracket. The jaw bracket then conducts the current to the bus. Only two pairs of contact fingers are shown in the present embodiment, however, additional fingers can be employed depending on the amount of current being conducted. For example, for a 1200 Amp switch 4 fingers are used and for a 600 Amp switch there will be 2 fingers.

Contact finger springs 513 create contact pressure between the contact fingers 507, 509 and the blade assembly 515. Contact pressure is desired for a low resistance connection. According to the embodiment shown, there is one contact finger spring 513 providing contact pressure for each respective contact finger.

Jaw bypass 517 is a sacrificial piece of conductive material that directs any arc from the blade to the jaw bracket. The jaw bypass 517 maintains contact with the blade assembly 515 until the switch is rolled to the closed position to prevent an arc between the blade assembly and the contact fingers.

As shown in FIG. 20, blade bumper 601 is a cylindrical rubber component that attaches to the back of the housing. The bumper 601 serves as a force damper when the blade slams into the back of the housing. Whip keeper 603 catches the whip while the switch is opening. Keeper 603 also holds on to the whip until the blade is far enough away from the jaw assembly to prevent arcing between the jaw and blade.

Figure 21:
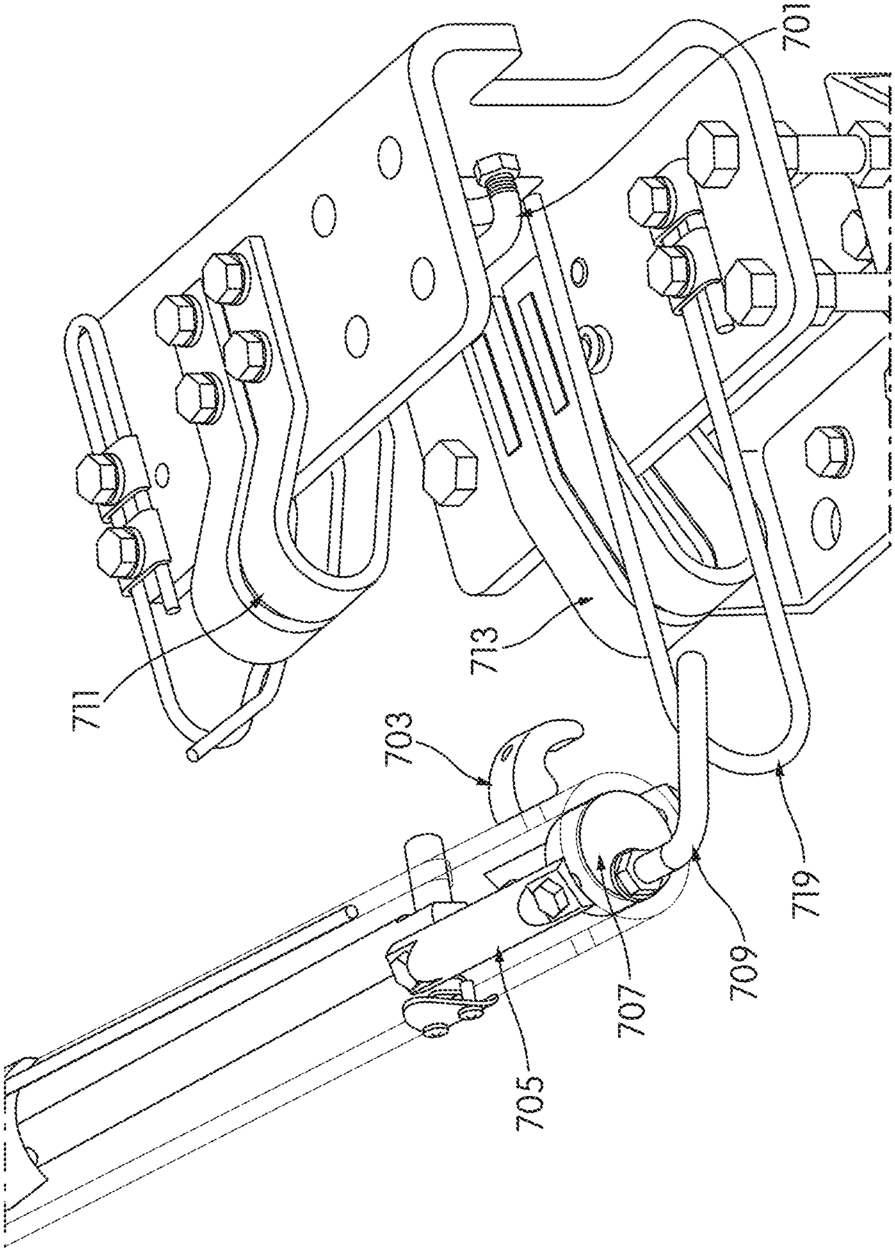
FIG. 21 is a perspective view showing how a blade assembly interacts with a jaw assembly in accordance with one embodiment of the switch shown in FIG. 16.

Referring to FIG. 21, blade catch u-bolt 701 is mounted to the back of the jaw bracket and engages with the blade catch 703 attached to the portion of the blade facing the jaw. The blade catch u-bolt 70 can be adjusted to protrude more, or less, towards the blade so that it holds the blade in the jaw where the maximum contact pressure can be obtained. Blade catch 703 is mounted to the blade such that when the blade enters and then rolls into the jaw, the blade catch engages with the blade catch u-bolt 701. When engaged, the blade cannot come out of the jaw.

Top and bottom blade contacts 705, located in this embodiment 180 degrees from each other, are positioned on the top and bottom of the blade, respectively, and make electrical contact with the contact fingers when the switch is rolled into the closed position in the jaw. Blade plug 707 is fastened in the end of the blade and provides a mounting surface for the blade arcing horn 709 as well as a means of preventing insects from entering the tube.

Arcing horn 709 is a sacrificial piece of conductive material that directs any arc from the blade to the jaw. More particularly, the blade arcing horn 709 maintains contact with the jaw bypass 719 until the switch is rolled into the closed position to prevent an arc between the blade contacts 705 and the top and bottom contact fingers 711, 713, respectively.

Figure 22:
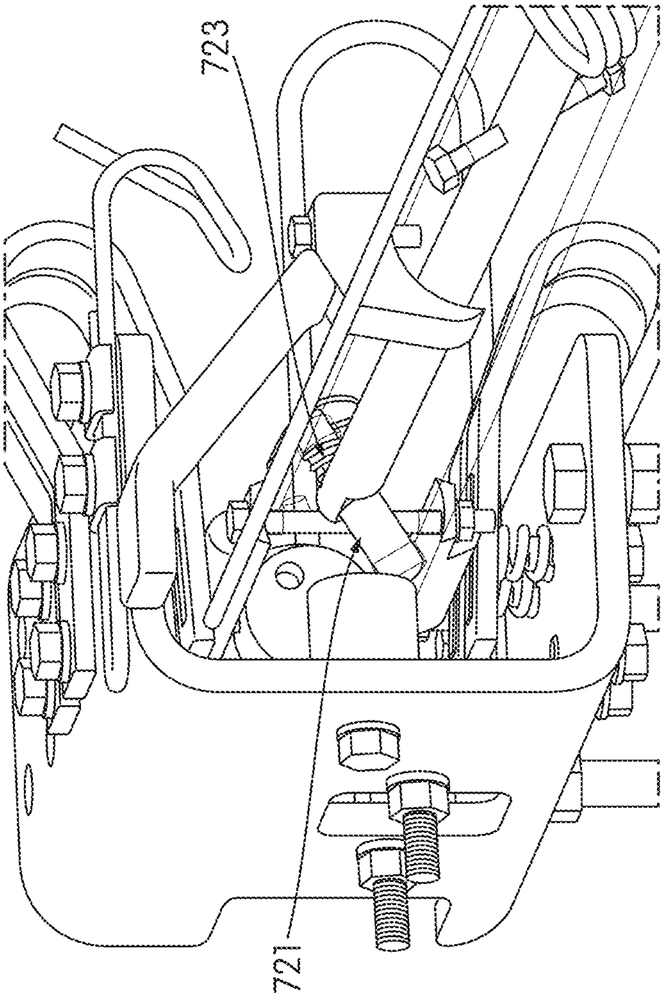
FIG. 22 is a close-up perspective view showing how a blade assembly connects with a jaw assembly when the switch is closing in accordance with one embodiment of the switch shown in FIG. 16.

Referring to FIG. 22, rocker pin 721 on the jaw end of the blade helps prevent the blade from rolling when it is not in the jaw. The pin 721 normally protrudes out of the blade, but when the pin contacts the blade bumper as the blade approaches the jaw during a switch closing operation, the pin is pushed into the blade. Rocker spring 723 pushes the rocker pin out so that it is always pushed out when not in contact with the blade bumper.

Figure 23:
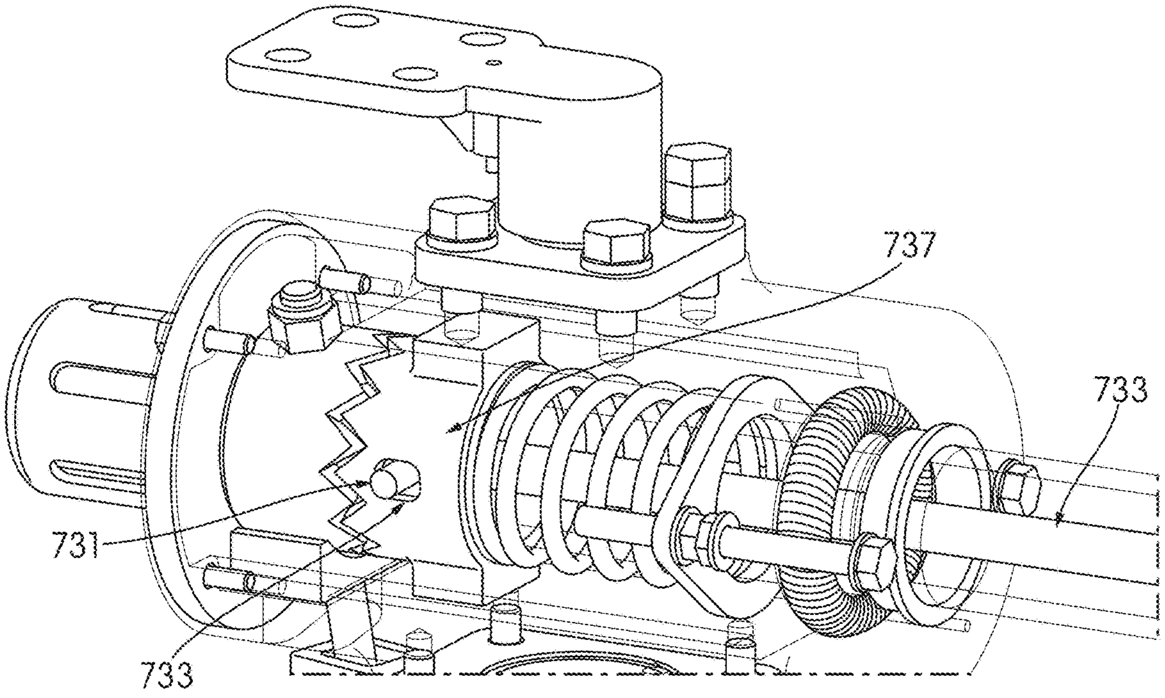
FIG. 23 is a perspective view of the housing assembly showing how the rocker mechanism interacts with the toggle mechanism in accordance with one embodiment of the switch shown in FIG. 16.

Referring to FIG. 23, a rocker pin 731 in the housing is connected to the rocker shaft 733. The pin is normally out of the blade and sticking through the hole 735 in the toggle member 737. When the rocker pin 721 (FIG. 23) on the jaw end is pushed into the blade, rocker pin 731 recesses into the toggle member 737. This allows for the toggle member 737 to slide, e.g., parallel to the blade axis. Rocker shaft 733 pivots around a bolt, for example a ¼" bolt, (not shown), in the center of the blade. This bolt links the rocker pin 721 on the jaw end to the rocker pin 731 in the housing.

Figure 24:
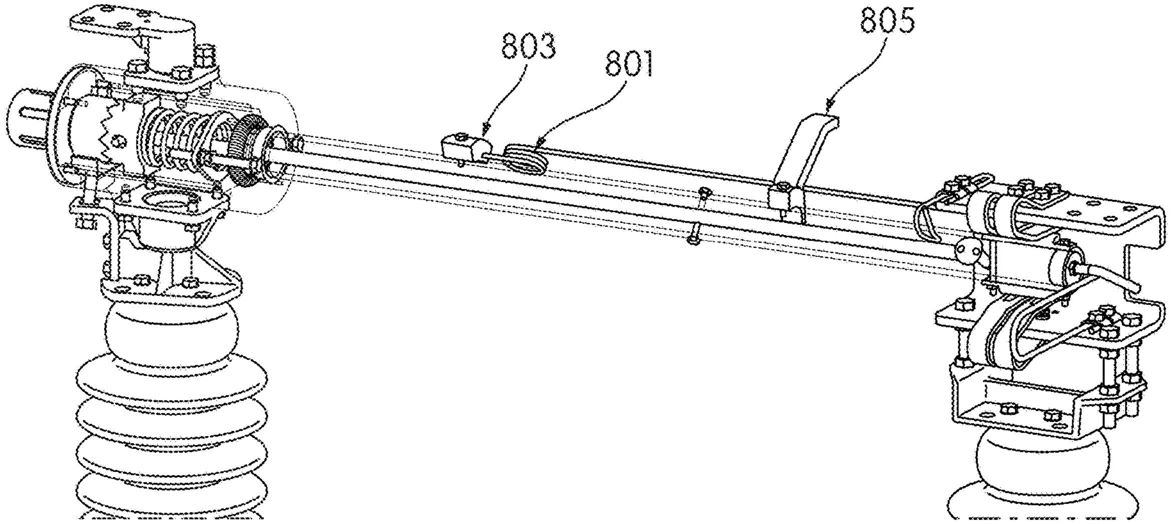
FIG. 24 is a perspective view of a whip assembly in accordance with an embodiment of the switch shown in FIG. 16.

Referring to FIG. 24, whip 801 is a spring loaded wire that prevents arcing during the opening of the switch. The whip carries current from the blade to the jaw for the time that it takes the switch to open. When the blade exits the area around the jaw where arcing is possible, whip 801 releases from the jaw and hits the blade. The whip releases at a fast enough speed to prevent arcing. Whip spring mount 803 is attached to the blade and holds the whip in the correct position relative to the blade. Whip stop 805 stops the whip after it releases from the jaw. It also holds the whip in the correct position so that the whip keeper catches it when the switch is closing.

The operation of closing and opening the switch will now be described. First, closing the switch will be described. The switch is considered open when the blade is not in contact with the jaw. At this point, both rocker pins 721, 731 are sticking out of the blade. The rocker pin 731 in the housing is sticking through the slot in the toggle mechanism. The blade is not able to roll and indicator 315 displays green, indicating the switch is open.

The switch is then operated by rotating the pivot as described above. The initial rotation directs the blade towards, and ultimately into, the jaw assembly. The blade then hits the blade bumper in the jaw and the blade bumper pushes the rocker pin 721 on the jaw end into the blade. The rocker shaft then pulls the rocker pin 731 in the housing out of the toggle mechanism slot allowing it to move freely.

Since, the blade is already hitting the jaw, the housing is no longer able to rotate. Only the bottom half of the rotator is able to rotate at this point. This results in the drive lever driving the drive bolt. When the drive lever is driven, the entire blade is urged in the rolling direction but in order for that to happen, the sliding portion of the toggle mechanism must be cleared. The rotation of the toggle mechanism creates a force that pushes the sliding portion out of the way which compresses the toggle mechanism spring. The force against the toggle mechanism helps prevent the blade from rolling when it is not in the jaw.

Figure 25:
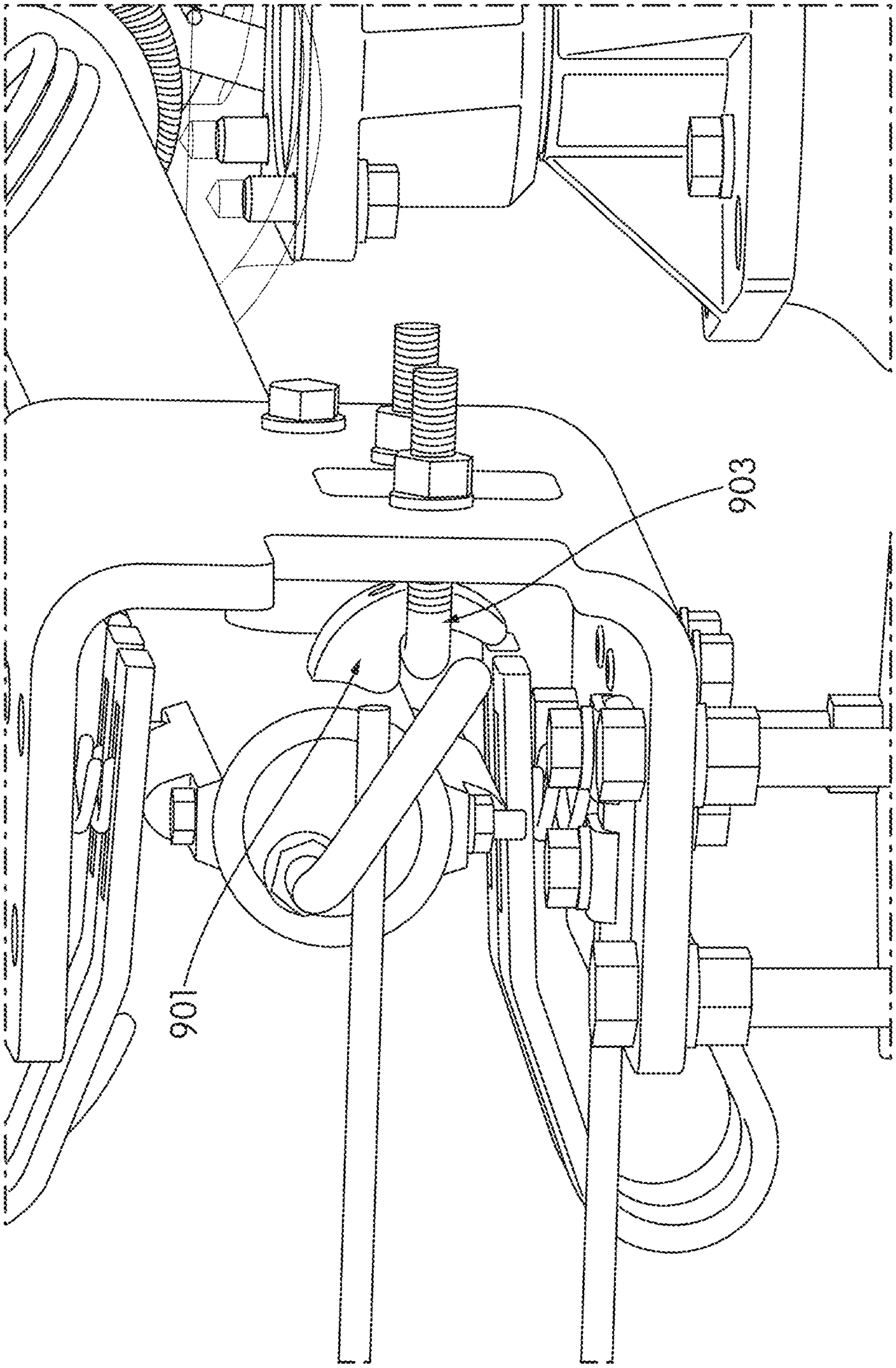
FIG. 25 is a perspective view

Referring to FIG. 25, the blade is rolled, for example, by about 30 degrees, into the jaw. The blade latch 901 hooks around the blade catch u-bolt 903 thereby locking the blade in the jaw until the pivot is rotated in the opening direction. The indicator now displays red.

The first 30 degrees of rotation is to roll the blade 30 degrees in the jaw.

Since, the blade latch is holding the blade in the jaw, the housing is unable to rotate during this initial rotation. The drive lever drives the blade and toggle mechanism in the reverse direction that it did in the closing.

Now, the opening operation is discussed. Once, the blade has been rolled by approximately 30 degrees, the blade is free to swing out of the jaw. When the blade leaves the jaw, the rocker pin 721 on the jaw end of the blade is pushed out of the blade by the rocker spring. This results in the rocker pin in the housing being pushed into the toggle mechanism slot. The rocker pin in the housing now holds the toggle mechanism which prevents the blade from the rolling when not in the jaw. As the blade is leaving the jaw, the whip keeper catches the whip and holds it. When the blade gets far enough away to prevent arcing, the whip keeper releases the loaded spring whip. The whip action can extinguish small arcs as can be found on shorter unloaded transmission lines.

Figure 26:
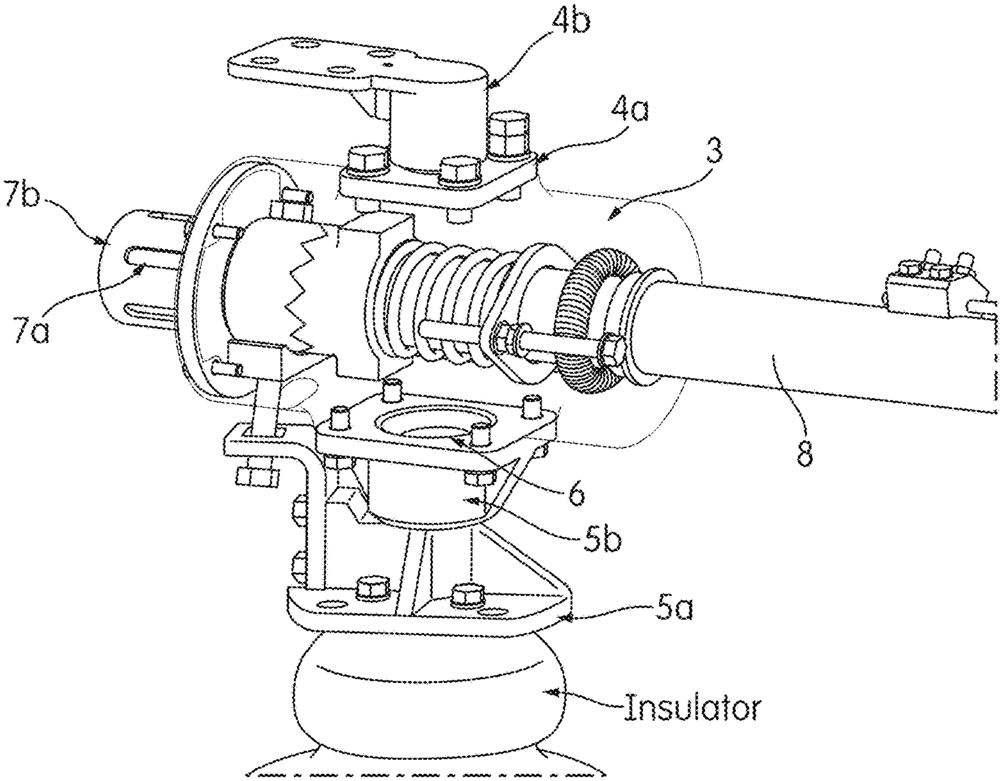
FIGS. 26 and 27 are perspective views of a housing assembly in accordance with an alternative embodiment of the switch shown in FIG. 16.

A further embodiment is described in reference to FIGS. 26-33. Referring to FIG. 26, housing 3 is an aluminum cylinder on top of the insulator and which encloses the mechanism components described in further detail below. A terminal pad assembly 4 includes 2 pieces. Housing plate **4*a* of the terminal pad assembly bolts to the housing 3 and plate 4*b* threads onto housing plate 4*a***. This creates a current path from the housing to the bus work leading up to the switch and enables the assembly to rotate.

Rotator assembly 5 includes 2 pieces as well. Lower insulator plate **5*a* of the rotator assembly bolts directly to the insulator. For example, the lower insulator plate bolts to the insulator with a 3 inch bolt circle or a 5 inch bolt circle depending on the size of the switch and/or required stability. Upper insulator plate 5*b* of the rotator assembly is attached to lower insulator plate 5*a* using a 1¼" bolt. In one embodiment the use of two sets of needle bearings allows the rotator assembly to move freely. The housing then mounts to the top of upper insulator plate 5*b***.

Rotator gasket 6 in this embodiment is a rubber gasket that mounts between the rotator assembly 5 and the housing 3. This prevents moisture from ingressing into the bearings.

Indicator assembly 7 also includes 2 pieces. Indicator **7*a*, such as a sticker, has green and red stripes that wraps around the blade. Cap 7*b* is an aluminum casting that mounts to the back of the housing. Cap 7*b*** in the embodiment shown has slots in it so that only one of the colors of the indicator will show in each of the open and closed positions. When the blade is rolled in the closed position, only the red portion of the indicator is visible. When the blade is rolled in the open position, only the green portion is visible.

Blade 8 in the present embodiment is a 2 inch aluminum tube that runs through the center of the housing 3. The blade carries current between the jaw assembly (e.g., FIG. 16, 213) and the housing assembly (e.g., 207, FIG. 16).

Figure 27:
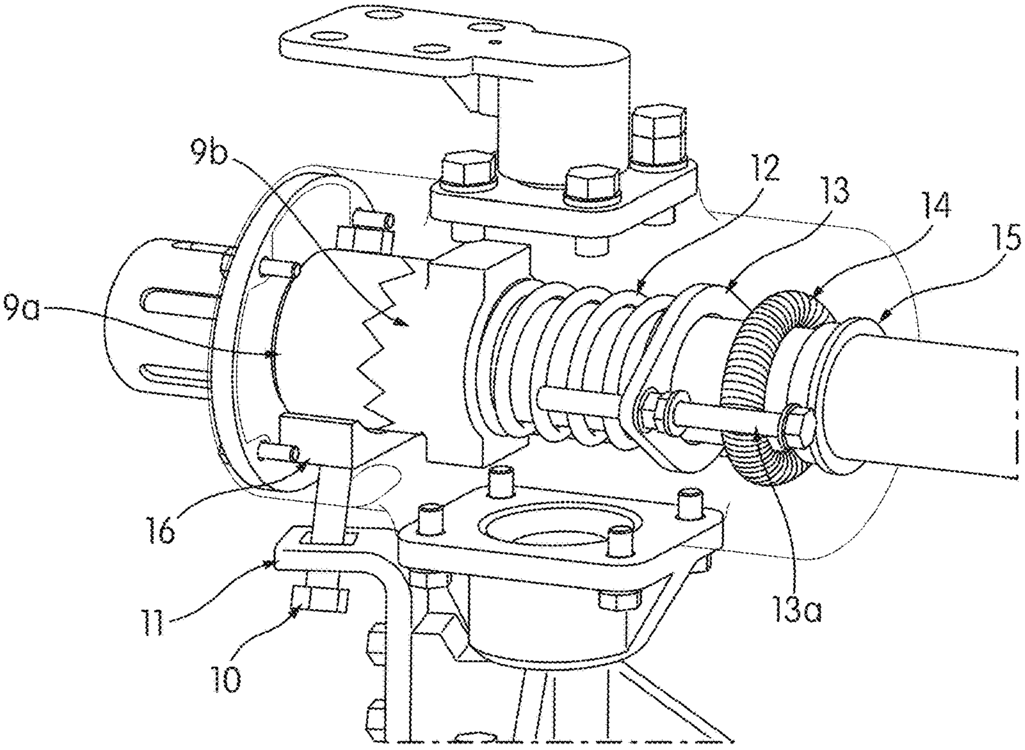

Referring to FIG. 27, toggle mechanism 9 includes two parts, each disposed within the housing 3. First part ga of the toggle mechanism is fixed to the blade by a drive bolt (not shown). Part **9*b*** of the toggle mechanism is not connected, or at least not fixedly attached, to the blade but it is constrained by the housing so that it is not able to rotate. It is only able to slide along the axis of the blade. The teeth force the blade to settle to a full open or full closed position.

With continued reference to FIG. 27, drive bolt 10 is a ½-inch bolt that runs through the toggle mechanism (**9*a***) and the blade. The head of the bolt sticks out the bottom of the housing and, for example, a Nylock nut is threaded on the opposite end of the bolt to hold it fixed within the housing.

Drive lever 11 is bolted to the rotator (**5*a*). The drive bolt runs through a hole in the drive lever. When the rotator assembly rotates, the drive lever rotates the drive bolt which then rotates the toggle mechanism (5*a***) inside the housing.

Toggle mechanism spring 12 applies a force to the toggle mechanism 9 forcing the teeth to the full open or closed position. Spring plate 13 adjusts the amount of preload that needs to be applied to spring 12. For example, spring plate 13 is adjusted by one or more bolts **13*a*** protruding from the front of the housing.

Canted coil spring 14 conducts the current from the blade to the housing and is set in a very tight groove in the housing so that it squeezes the blade, creating a low resistance connection between the blade and housing. One or more bushings 15 keep the blade concentric with the housing. For example, there is a bushing on the front of the housing and through the back cover plate. Bug guard 16 is, for example, a plastic piece underneath the toggle mechanism (9*a*) that prevents insects from entering the housing.

Figure 28:
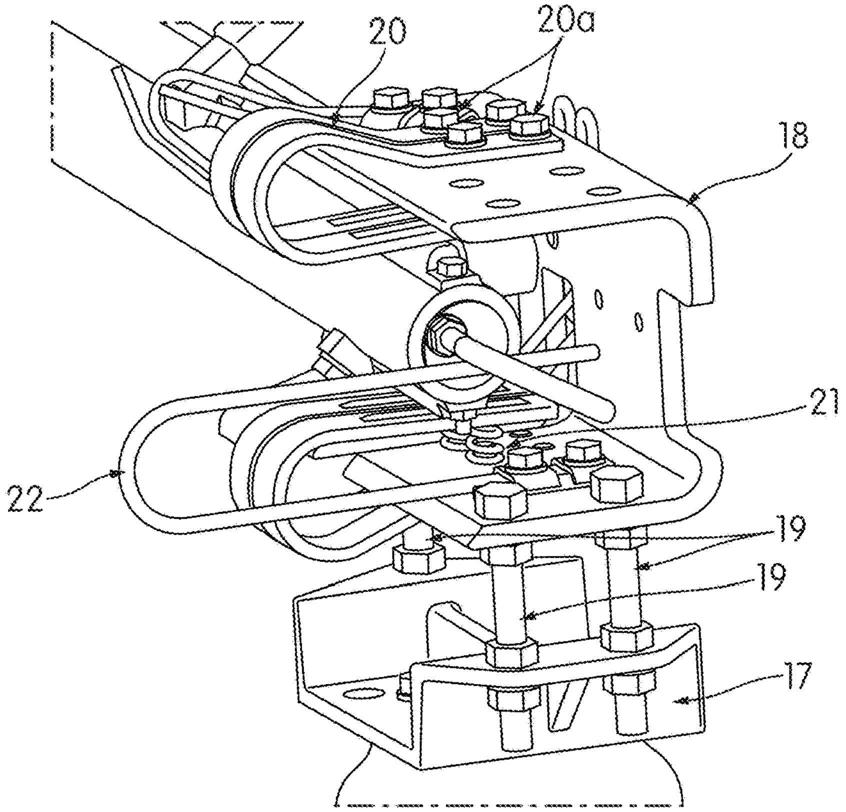
FIGS. 28-31 are perspective views of a jaw assembly in accordance with an alternative embodiment of the switch shown in FIG. 16.

Referring to FIG. 28, jaw support 17 mounts to the insulator. For example, the jaw support can be mounted to an insulator with a 3 inch or 5 inch bolt circle. In this embodiment, the jaw 18 mounts to the jaw support 17 using 3 jaw adjustment bolts 19 and the components of the jaw assembly mount to the jaw. The three jaw adjustment bolts 19 are used to level the jaw. For example, the jaw must be adjusted so that the blade assembly makes correct contact with the jaw assembly when opening and closing.

Contact fingers 20 are mounted to the jaw 18, for example, using a number of bolts 20*a* or other attachment device. When the blade is in the closed position, the fingers conduct the current from the blade assembly to the jaw. The jaw then conducts the current to the bus. For example, for a 1200 Amp switch there will be 4 fingers and for a 600 Amp switch there will be 2 fingers.

Contact finger springs 21 create contact pressure between the contact fingers and the blade assembly. The contact pressure is needed for a low resistance connection. In the embodiment shown, there is one contact finger spring for each contact finger. Jaw arc horn 22 is a sacrificial piece that directs the arc from the blade to the jaw. The jaw arc horn maintains contact with the blade assembly until the switch is rolled to the closed position to prevent an arc between the blade assembly and the contact fingers.

Figure 29:
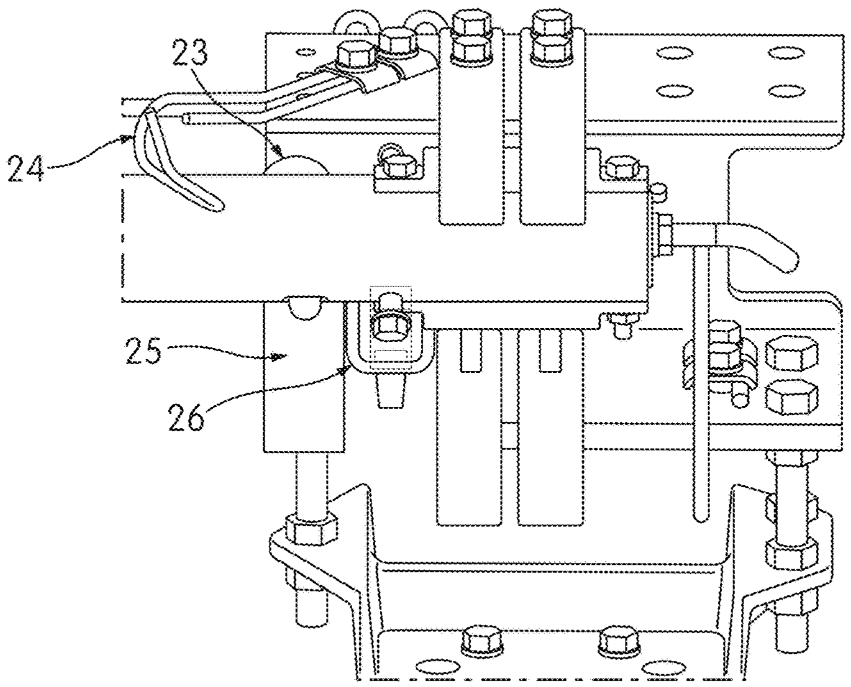

Referring to FIG. 29, blade bumper 23 is a rubber part that bolts to the back of the housing. The bumper serves as a force damper when the blade slams into the back of the housing. Whip keeper 24 catches the whip while the switch is opening. For example it holds on to the whip until the blade is far enough away from the jaw assembly to prevent arcing between the jaw and the blade.

Release pin ramp 25 is apiece bolted inside of the bottom of the jaw. It makes contact with the release pin as the blade enters the jaw and pushes the release pin up into the blade. Blade latch spring 26 is mounted to the back of the jaw and engages with the blade latch which is located on the blade assembly. The blade latch spring is adjustable so that it catches the blade regardless of the speed of operation.

Figure 30:
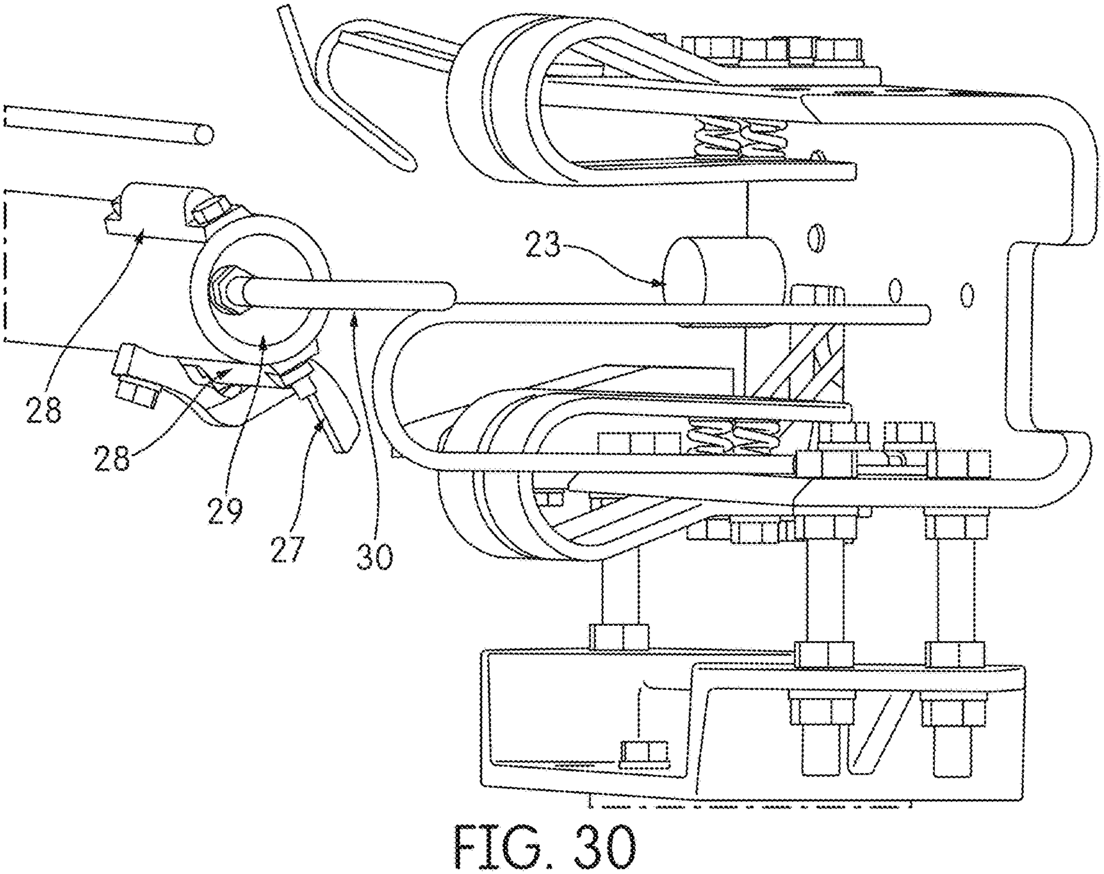

Referring to FIG. 30 blade latch 27 is mounted to the blade. When the blade rolls into the jaw, the blade latch engages with the blade latch spring. When engaged, the blade cannot come out of the jaw. The blade contacts 28 make contact with the contact fingers when the switch is rolled closed into the jaw. In the embodiment illustrated, the blade contacts on the blade are positioned 180 degrees apart, on opposite sides of the cylindrical blade.

Blade plug 29 is fastened in the end of the blade. The blade plug provides a mounting surface for the blade arcing horn as well as a means of preventing insects from entering the tube. Blade arc horn 30 is a sacrificial piece that directs the arc from the blade to the jaw. The blade arc horn maintains contact with the jaw arc horn until the switch is rolled to the closed position to prevent an arc between the blade contacts and the contact fingers.

Figure 31:
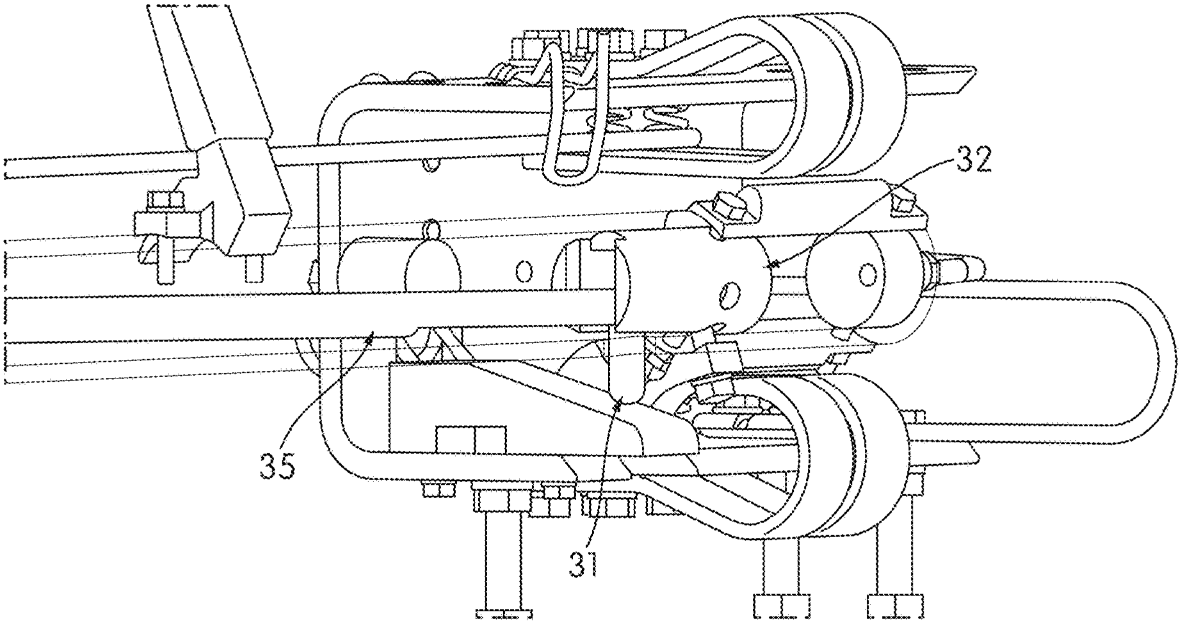
Figure 32:
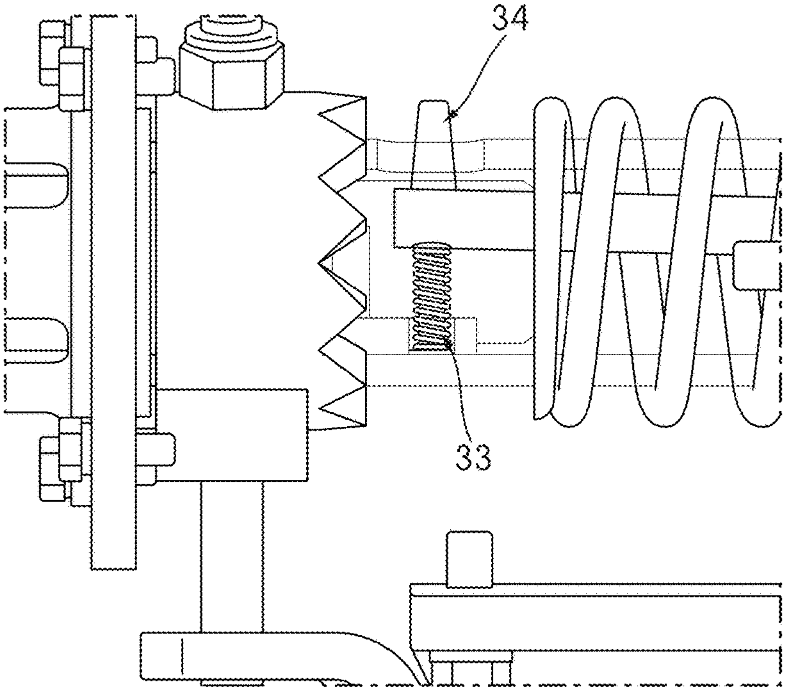
FIG. 32 is a perspective view showing the rocker spring and rocker pin housing within the housing assembly in accordance with one embodiment.

Referring to FIG. 31, a rocker pin 31 on the jaw end prevents the blade from rolling when it is not in the jaw. The pin is normally out of the blade, but when it hits the release pin ramp, it pushes into the blade. Rocker guides 32 keep the rocker shaft center in the tube. In this embodiment a guide (not shown) is located in the tube on the jaw end and on the housing end. Rocker spring 33 (FIG. 32) pushes the rocker pin on the housing end out so that it is always pushed out when not in contact with the blade bumper.

Rocker pin 34 (FIG. 32) in the housing is connected to the rocker shaft. The pin is normally out of the blade and sticking through the hole in the toggle mechanism (9*b*). When the rocker pin on the jaw end is pushed into the blade. This pin recesses into the toggle mechanism. This allows for the toggle mechanism to slide. Rocker shaft 35 (FIG. 31) pivots around, for example, a ¼-inch bolt in the center of the blade. It links the rocker pin on the jaw end to the rocker pin in the housing.

Figure 33:
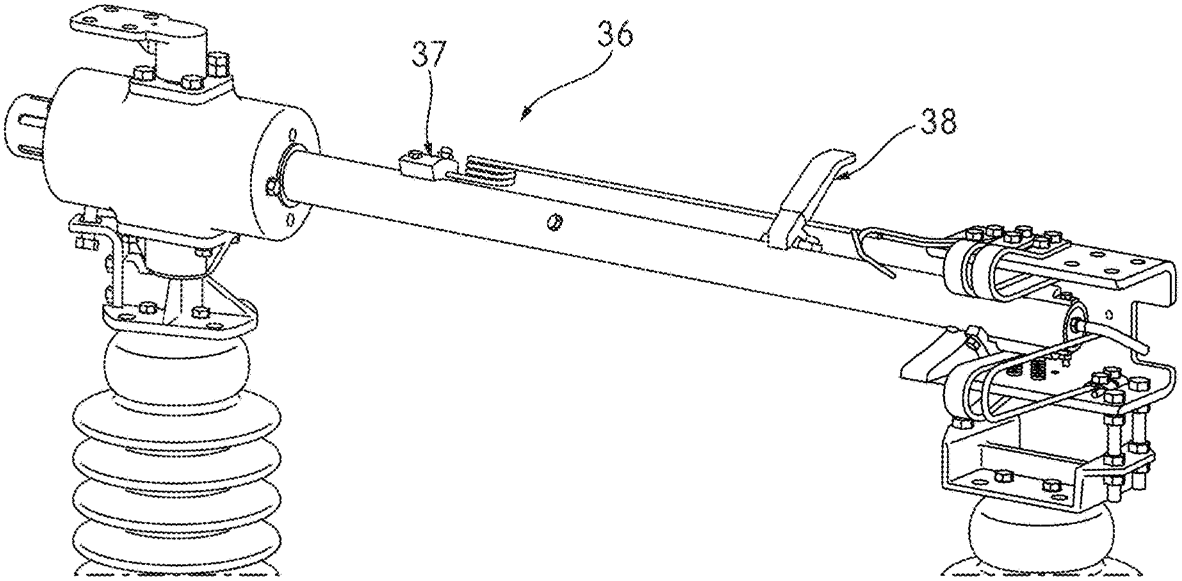
FIG. 33 is perspective view of a whip assembly in accordance with an alternative embodiment of the switch shown in FIG. 16.

Referring to FIG. 33, whip 36 is a spring loaded wire that prevents arcing during the opening of the switch. The whip carries current from the blade to the jaw for the time that it takes the switch to open. When the blade exits the area around the jaw where arcing is possible, the whip releases from the jaw and hits the blade. The whip releases at a fast enough speed to prevent arcing. Whip spring mount 37 holds the whip in the correct position on the blade. In this embodiment the whip spring mount is fixed to the blade. Whip stop 38 stops the whip after it releases from the jaw. It also holds the whip in the correct position so that the whip keeper catches it when the switch is closing.

Figure 34:
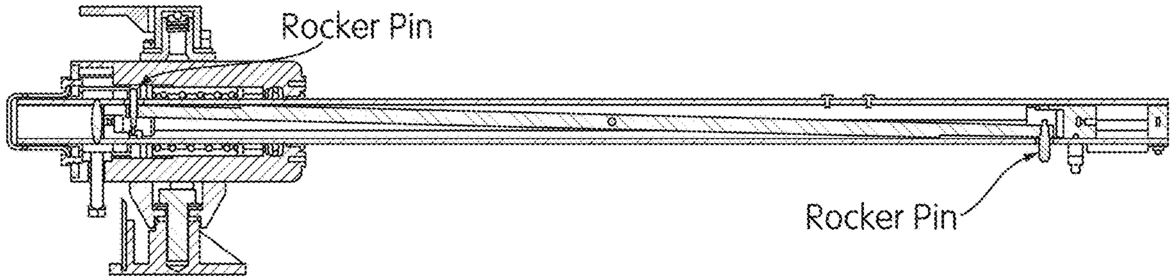
FIGS. 34-35 are perspective views of an alternative embodiment of the switch illustrating the closing operation.
Figure 35:
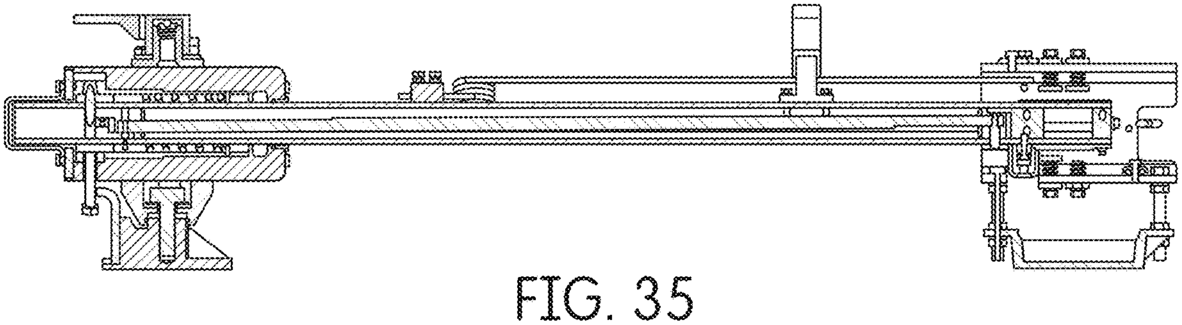
Figure 36:
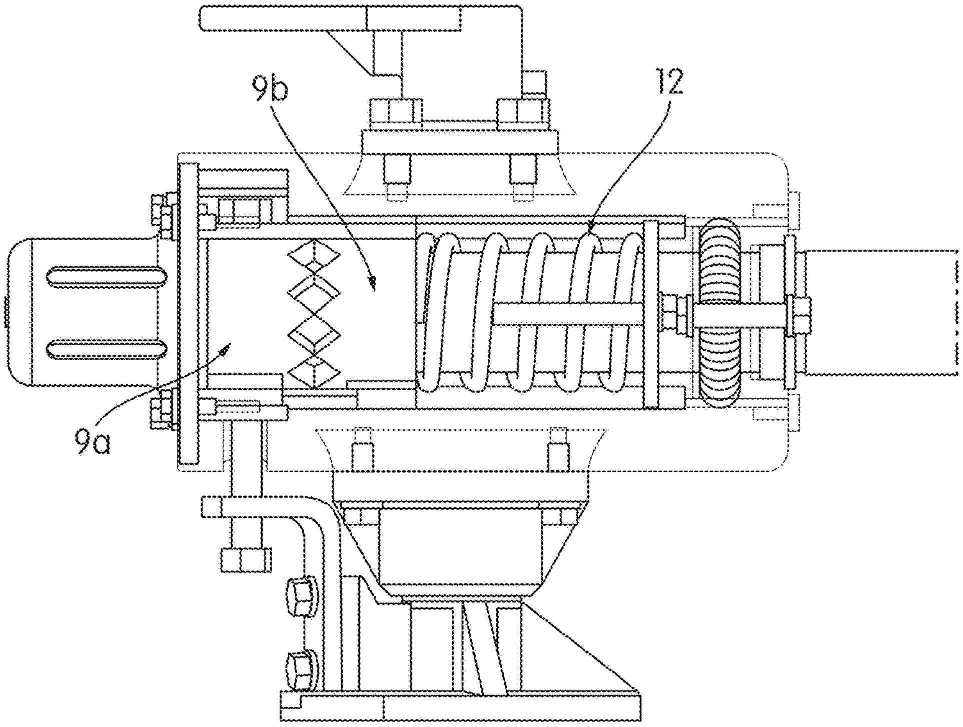
FIG. 36 is perspective view of a housing assembly in accordance with an alternative embodiment of the switch illustrating the opening operation of the switch.

Operation of a switch will now be described in reference to FIGS. 34-36. The switch is considered open when the blade is not in contact with the jaw. At this point, both rocker pins are sticking out of the blade. The rocker pin in the housing is sticking through the slot in the toggle mechanism. The blade is not able to roll. The indicator is showing green. A section view in the opened position is shown in FIG. 34. The switch is operated by rotating the pivot. The initial rotation sends the blade into the jaw assembly. Referring to FIG. 35, the blade hits the blade bumper in the jaw.

The release pin ramp pushes the rocker pin on the jaw end into the blade. The rocker shaft then pulls the rocker pin in the housing out of the toggle mechanism slot allowing it to move freely. The blade is in the jaw but it is not closed yet. The last 30 degrees of rotation is used for rolling the blade. Since, the blade is already hitting the jaw, the housing is no longer able to rotate. Only the bottom half of the rotator is able to rotate at this point. This results in the drive lever driving the drive bolt. When the drive lever is driven, the entire blade wants to roll. In order for that to happen, the sliding portion of the toggle mechanism must be cleared. Referring to FIG. 36, the rotation of the toggle mechanism creates a force that pushes the sliding portion out of the way which compresses the toggle mechanism spring. The force against the toggle mechanism helps prevent the blade from rolling when it is not in the jaw.

The blade is rolled 30 degrees into the jaw. The blade latch (27, FIG. 30) hooks around the blade latch spring (26, FIG. 29) This catching device locks the blade in the jaw until the pivot is rotated in the opening direction. For example, the indicator should now show red, or otherwise provide some other indication that the switch is closed.

The first 30 degrees of rotation is to roll the blade 30 degrees in the jaw. Since, the blade latch is holding the blade in the jaw, the housing is unable to rotate during this initial rotation. The drive lever drives the blade and toggle mechanism in the reverse direction that it did in the closing. Once, the blade has been rolled 30 degrees, the blade is free to swing out of the jaw. When the blade leaves the jaw, the rocker pin on the jaw end of the blade is pushed out of the blade by the rocker spring (33). This results in the rocker pin in the housing being pushed into the toggle mechanism slot.

The rocker pin in the housing now holds the toggle mechanism which prevents the blade from the rolling when not in the jaw.

As the blade is leaving the jaw, the whip keeper catches the whip and holds it. When the blade gets far enough away to prevent arcing, the whip keeper releases the loaded spring whip. The whip action can extinguish small arcs as can be found on shorter unloaded transmission lines.

Exemplary embodiments of the application have been described in considerable detail. Many modifications and variations to these exemplary embodiments described will be apparent to a person of ordinary skill in the art. Therefore, the invention should not be limited to the embodiments described, but should be defined by the claims that follow.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

The invention claimed is:

1. A blade assembly for an electrical switch, the blade assembly comprising:

a rocker assembly configured to enable rotation of said blade assembly, said rocker assembly including:

a first rocker component, said first rocker component having a first rocker pin, and a second rocker component, said second rocker component having a second rocker pin that depresses when said first rocker pin is depressed;

wherein when said first rocker pin and said second rocker pin are projecting out of said blade assembly, said blade assembly is unable to rotate.

2. The blade assembly of claim 1, wherein said blade assembly is configured to rotate about an axis.

3. The blade assembly of claim 2, wherein when said blade assembly is rotated about said axis, a blade catch engages a jaw assembly of said electrical switch.

4. The blade assembly of claim 2, wherein said axis is perpendicular to a second axis when a first end of said blade assembly is seated in a jaw assembly.

5. The blade assembly of claim 4, wherein said blade assembly pivots about said second axis to drive an electrically conductive blade contact into said jaw assembly to close said electrical switch.

6. The blade assembly of claim 5, wherein said electrically conductive blade contact is attached to said first end of said blade assembly.

7. The blade assembly of claim 1, wherein said first rocker component is disposed at a first end of said blade assembly and said second rocker component is disposed at a second end of said blade assembly, said second end being distal from said first end.

8. The blade assembly of claim 7, wherein said second rocker component is activated to enable rotation of said blade assembly in response to said first rocker component being activated.

9. The blade assembly of claim 1, further comprising a rocker shaft disposed within said blade assembly and linking said first rocker pin and said second rocker pin.

10. The blade assembly of claim 9, wherein said first rocker pin is activated when said first rocker pin contacts a jaw assembly and said rocker shaft activates said second rocker pin when said first rocker pin is activated.

11. The blade assembly of claim 1, wherein said rocker assembly further includes a rocker spring.

12. The blade assembly of claim 11, wherein said rocker spring is configured to actuate said first rocker pin at least partially out of said blade assembly.

* * * * *